U S009735717B1

United States Patent
Kimura et al.

(10) Patent No.: US 9,735,717 B1
(45) Date of Patent: Aug. 15, 2017

(54) BRUSHLESS MOTOR AND WIPER APPARATUS

(71) Applicant: Mitsuba Corporation, Gunma (JP)

(72) Inventors: Masaaki Kimura, Gunma (JP); Hiroto Tanaka, Gunma (JP); Tamotsu Iwazaki, Gunma (JP); Tomohiko Annaka, Gunma (JP); Naoki Kojima, Gunma (JP); Junya Kitazawa, Gunma (JP)

(73) Assignee: Mitsuba Corporation, Kiryu-shi, Gunma (JP)

( * ) Notice: Subject to any disclaimer, the term of this patent is extended or adjusted under 35 U.S.C. 154(b) by 0 days.

(21) Appl. No.: 15/490,966

(22) Filed: Apr. 19, 2017

Related U.S. Application Data

(63) Continuation of application No. 14/394,628, filed as application No. PCT/JP2013/061336 on Apr. 16, 2013, now Pat. No. 9,660,559.

(30) Foreign Application Priority Data

Apr. 16, 2012 (JP) .................................. 2012092882
Feb. 26, 2013 (JP) .................................. 2013036019

(51) Int. Cl.
*H02P 23/12* (2006.01)
*H02P 6/15* (2016.01)
(Continued)

(52) U.S. Cl.
CPC ................ *H02P 6/153* (2016.02); *B60S 1/08* (2013.01); *B60S 1/26* (2013.01); *H02K 7/1166* (2013.01); *H02K 11/215* (2016.01); *H02P 6/16* (2013.01); *B60S 1/0818* (2013.01); *B60S 1/0896* (2013.01); *B60S 1/166* (2013.01)

(58) Field of Classification Search
CPC .... Y02T 10/641; Y02T 10/643; B60L 15/025; H02P 21/0089; H02K 21/029
See application file for complete search history.

(56) References Cited

U.S. PATENT DOCUMENTS 5,982,123 A * 11/1999 Hornung ............... B60S 1/0807
                                                              318/266
2007/0290556 A1 * 12/2007 Hochhalter .............. H02K 7/06
                                                             310/12.14
(Continued)

*Primary Examiner* — Shawki S Ismail
*Assistant Examiner* — Zoheb Imitiaz
(74) *Attorney, Agent, or Firm* — McCormick, Paulding & Huber LLP

(57) ABSTRACT

A brushless motor comprises: a stator 21 having armature coils 21a, 21b, and 21c; a rotor 22 which is rotated by a revolving magnetic field; and a switching element 30a, wherein the brushless motor has a rotation number control unit 33 which switches between low-speed and high-speed mode, wherein in the low-speed mode, the rotation number control unit 33 supplies current to the armature coils 21a, 21b, and 21c at predetermined energization timing and controls a duty ratio to control the rotation number of the rotor 22, and in the high-speed mode, the rotation number control unit 33 supplies current to the armature coils 21a, 21b, and 21c at energization timing advanced from the energization timing for the low-speed mode, thereby performing field weakening control of weakening the revolving magnetic field from that of the low-speed mode to control the rotation number of the rotor 22.

15 Claims, 23 Drawing Sheets

(51) Int. Cl.
   *H02P 6/16* (2016.01)
   *H02K 11/215* (2016.01)
   *H02K 7/116* (2006.01)
   *B60S 1/08* (2006.01)
   *B60S 1/26* (2006.01)
   *B60S 1/16* (2006.01)

(56) References Cited

U.S. PATENT DOCUMENTS

2013/0013154 A1* 1/2013 Aoki ............... B62D 5/046
                                              701/42
2013/0018546 A1* 1/2013 Zimmer ............ B60S 1/0896
                                              701/36

* cited by examiner

FIG. 23A

High-speed Wiping

| Operating Angle | Vehicle Speed [km] | | | | | | | | | |
|---|---|---|---|---|---|---|---|---|---|---|
| | V1≦V<V2 | | V2≦V<V3 | | V3≦V<V4 | | ... | | |
| | Advance Angle | Energization Angle | Advance Angle | Energization Angle | Advance Angle | Energization Angle | Advance Angle | Energization Angle |
| θ1 | θmH1 | θcH1 | θmH4 | θcH4 | θmH7 | θcH7 | · | · |
| θ2 | θmH2 | θcH2 | θmH5 | θcH5 | θmH8 | θcH8 | · | · |
| θ3 | θmH3 | θcH3 | θmH6 | θcH6 | θmH9 | θcH9 | · | · |
| · | · | · | · | · | · | · | · | · |
| · | · | · | · | · | · | · | · | · |
| · | · | · | · | · | · | · | · | · |

FIG. 23B

Low-speed Wiping

| Operating Angle | Vehicle Speed [km] | | | | | | | | | |
|---|---|---|---|---|---|---|---|---|---|---|
| | V1≦V<V2 | | V2≦V<V3 | | V3≦V<V4 | | ... | | |
| | Advance Angle | Energization Angle | Advance Angle | Energization Angle | Advance Angle | Energization Angle | Advance Angle | Energization Angle |
| θ1 | θmL1 | θcL1 | θmL4 | θcL4 | θmL7 | θcL7 | · | · |
| θ2 | θmL2 | θcL2 | θmL5 | θcL5 | θmL8 | θcL8 | · | · |
| θ3 | θmL3 | θcL3 | θmL6 | θcL6 | θmL9 | θcL9 | · | · |
| · | · | · | · | · | · | · | · | · |
| · | · | · | · | · | · | · | · | · |
| · | · | · | · | · | · | · | · | · |

BRUSHLESS MOTOR AND WIPER APPARATUS

CROSS REFERENCE TO RELATED APPLICATION

This application is a continuation of U.S. patent application Ser. No. 14/394,628, filed Oct. 15, 2014, which claims foreign priority benefits under U.S.C. §119 from Japanese Patent Application No. JP2012092882 filed on Apr. 16, 2012 and from Japanese Patent Application No. JP2013036019 filed on Feb. 26, 2013, and from PCT/JP2013/061336 filed on Apr. 16, 2013 the contents of all of which are incorporated by reference herein.

TECHNICAL FIELD

The present invention relates to a brushless motor having: a rotor mounted with permanent magnets; and a stator provided with an armature coil, and a wiper motor.

BACKGROUND ART

Conventionally, examples of a motor in which the rotation number of a rotor is switchable are disclosed in Japanese Patent Application Laid-Open Publication Nos. JP2007202391, JP2007143278, and JP201093977. The motor described in Japanese Patent Application Laid-Open Publication Nos. JP2007202391 and JP2007143278 has a case, a magnet accommodated in the case, an armature rotatably provided inside the case and having a coil wound therearound, a shaft which rotates integrally with the armature, a commutator provided to the shaft, and a high-speed-operation brush and a low-speed-operation brush each of which is in contact with the commutator. When a driver operates a switch to select low-speed driving, a current flows through the low-speed-operation brush to cause the shaft to rotate at a low rotation number. On the other hand, when the driver operates the switch to select high-speed driving, a current flows through the high-speed-operation brush to cause the shaft to rotate at a high rotation number.

On the other hand, the motor described in Japanese Patent Application Laid-Open Publication No. JP201093977 has an annular-shaped stator fixed to the inner surface of a yoke housing and having a plurality of armature coils wound therearound, a rotor rotatably located inside the stator and having a rotating shaft, and a magnet provided to the rotating shaft. In the motor described in this Japanese Patent Application Laid-Open Publication No. JP201093977, magnetizing currents different in phase from each other are supplied to the plurality of armature coils to generate a revolving magnetic field, thereby causing the rotor to rotate. Additionally, the motor described in Japanese Patent Application Laid-Open Publication No. JP201093977 does not have brushes which are described in Japanese Patent Application Laid-Open Publication Nos. JP2007202391 and JP2007143278.

SUMMARY

Each of the motors described in Patent Documents 1 to 3 is provided with a switching element which controls timing of supplying a current to the armature coil, regardless of whether it is a brushless motor. And, the rotation number of the rotor is controlled by changing a duty ratio for ON/OFF control of the switching element. Thus, the composition of the motor is designed so that the rotor can be rotated at high speed, and control is performed in which a duty ratio when the rotor is rotated at a low rotation number is decreased, compared with a duty ratio when the rotor is rotated at a high rotation number. Therefore, the composition of the motor is designed with reference to the case when the rotor is rotated at a high rotation number, thereby posing a problem of increasing the composition An object of the present invention is to provide a brushless motor and wiper apparatus with their composition capable of being reduced as much as possible.

A brushless motor according to the present invention comprises: a stator having an armature coil to which a current is supplied; a rotor which is rotated by a revolving magnetic field formed by the armature coil and is connected to an operating member; and a switching element provided on a route for supplying the current to the armature coil, wherein the brushless motor has a rotation number control unit which controls a rotation number of the rotor with at least two control modes different in rotation number of the rotor from each other, and when a first control mode is selected from among the control modes, the rotation number control unit supplies the current to the armature coil at predetermined energization timing and controls a duty ratio indicating an ON ratio of the switching element to control the rotation number of the rotor and, when a second control mode is selected from among the control modes, the rotation number control unit supplies the current to the armature coil at energization timing advanced from the energization timing for the first control mode, thereby performing field weakening control of weakening the revolving magnetic field formed by the armature coil with respect to a revolving magnetic field for the first control mode to control the rotation number of the rotor.

The brushless motor according to the present invention may further comprise a speed reduction mechanism provided on a drive power transmission route from the rotor to the operating member, wherein the speed reduction mechanism has a structure of reducing an output rotation number relative to an input rotation number.

The brushless motor according to the present invention may further comprise a rotating direction control unit which rotates the rotor forward and backward by switching a direction of the current to be supplied to the armature coil.

In the brushless motor according to the present invention, a control board having the rotation number control unit may be provided, and the speed reduction mechanism and the control board may be accommodated in a common housing.

A wiper apparatus comprises: a wiper arm which is an operating member for wiping a windshield of a vehicle, wherein the wiper arm is connected to the rotor of the brushless motor according to any one of the above present inventions.

In the wiper apparatus according to the present invention, a sensor magnet and a rotation number sensor may be provided, the sensor magnet rotating integrally with the rotor, and the rotation number sensor outputting a signal according to a change in a magnetic pole of the sensor magnet when the rotor rotates, and when performing the field weakening control, the rotation number control unit controls the rotation number of the rotor by detecting the rotation number of the rotor on the basis of a signal from the rotation number sensor, and advancing the energization timing of the armature coil by an electrical angle of 30 degrees.

According to the present invention (claim 1), the rating of the brushless motor is determined with reference to the rotation number of the rotor in the first control mode, and the rotation number of the rotor in the second control mode can be obtained by the field weakening control. Therefore, the brushless motor can be reduced in size as much as possible.

According to the present invention (claim 2), the speed reduction mechanism can control the rotation number of the rotor, and amplify output torque with respect to input torque.

According to the present invention (claim 3), the rotor can be rotated reversely by switching the direction of a current flowing through the armature coil.

According to the present invention (claim 4), since the speed reduction mechanism and the control board are accommodated in the common housing, the brushless motor can be reduced in size, and it is possible to improve layoutability when the brushless motor is mounted on a target subject.

According to the present invention (claim 5), the windshield of the vehicle can be wiped by transmitting the drive power of the rotor of the brushless motor to the wiper arm to operate the wiper arm.

According to the present invention (claim 6), when field weakening control is performed, the rotation number of the rotor can be controlled by detecting the rotation number of the rotor on the basis of a signal from the rotation number sensor, and advancing the energization timing to the armature coil by an electrical angle of 30 degrees.

BRIEF DESCRIPTION OF THE DRAWINGS

FIGS. 23A and 23B are lists showing examples of first and second controls which are performed by the brushless motor according to the present invention;

DETAILED DESCRIPTION

Figure 1:
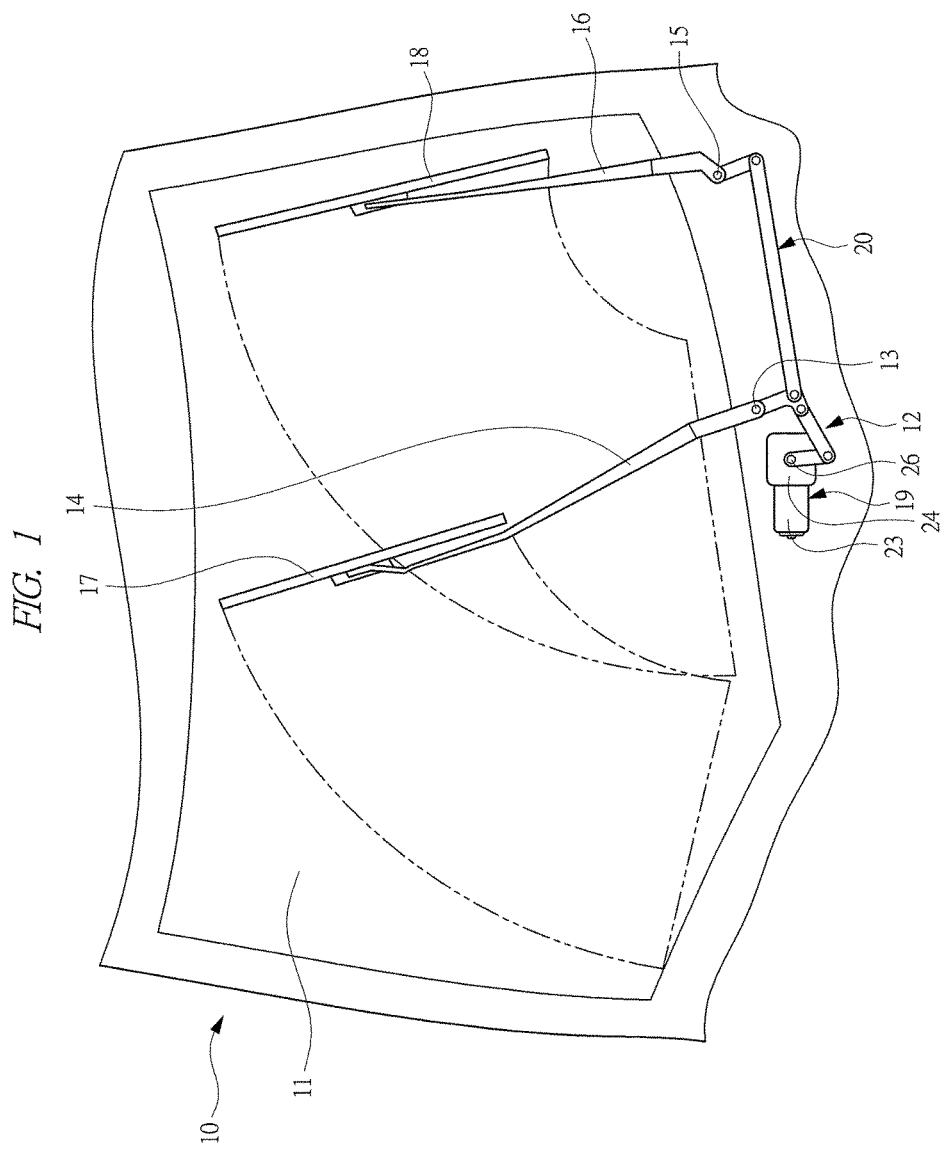
FIG. 1 is a schematic view showing an example in which a brushless motor according to the present invention is applied to a wiper apparatus of a vehicle.

Hereinafter, an embodiment of the present invention will be described in detail with reference to the drawings. A vehicle 10 shown in FIG. 1 has a windshield 11. The vehicle 10 further has a wiper apparatus 12 for wiping the windshield 11. The wiper apparatus 12 has: a wiper arm 14 which swings on a pivot shaft 13; and a wiper arm 16 which swings on a pivot shaft 15. A wiper blade 17 is mounted on a free end of the wiper arm 14, and a wiper blade 18 is mounted on a free end of the wiper arm 16. The wiper apparatus 12 further has a brushless motor 19 as a drive power source for driving the wiper arms 14 and 16. In this embodiment, the drive power of the brushless motor 19 is transmitted to the wiper arms 14 and 16 via a drive power transmission mechanism 20 composed of parts such as levers and links.

Figure 2:
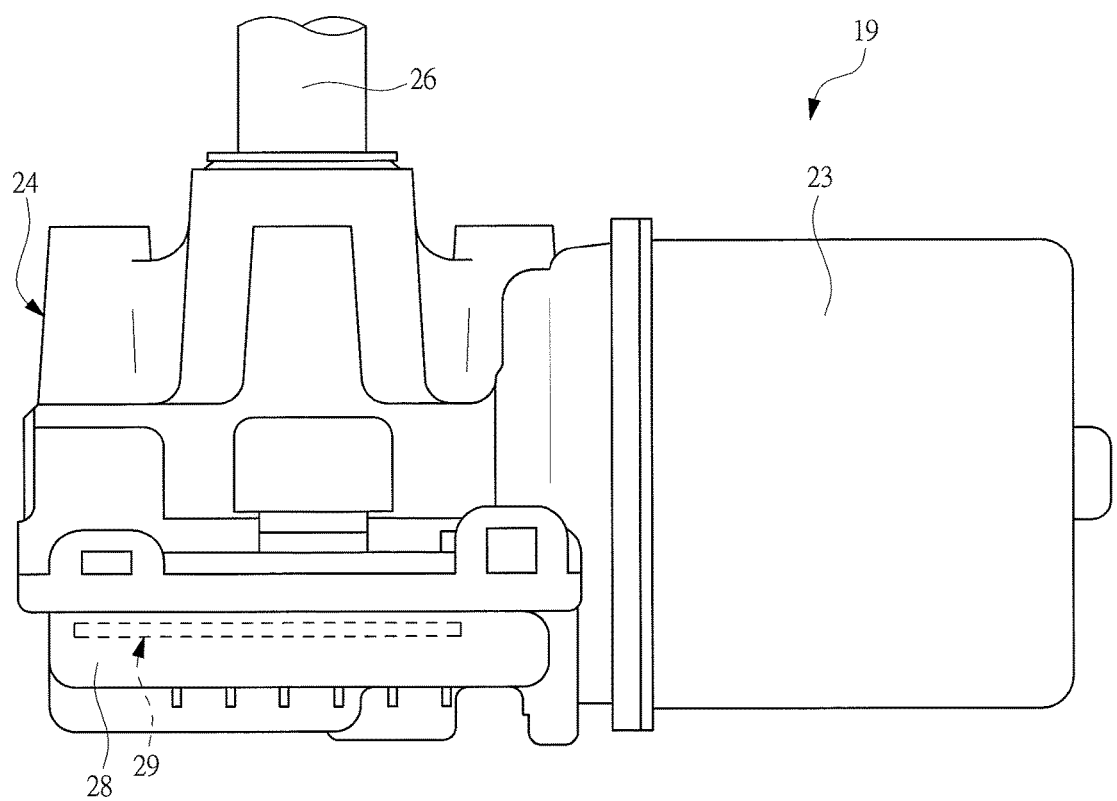
FIG. 2 is an external view showing the brushless motor according to the present invention.
Figure 3:
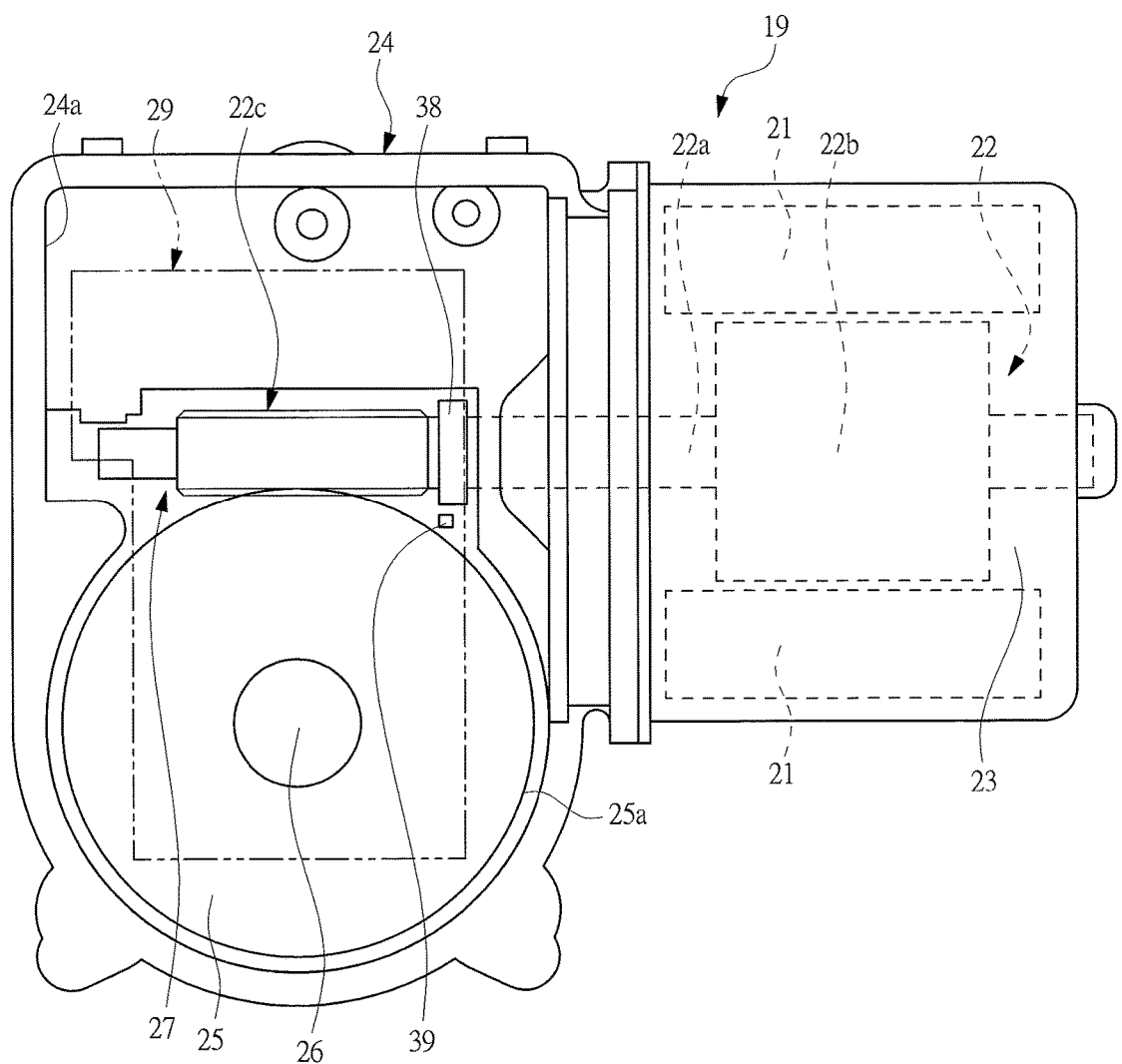
FIG. 3 is a bottom view showing the brushless motor according to the present invention with an undercover removed.
Figure 4:
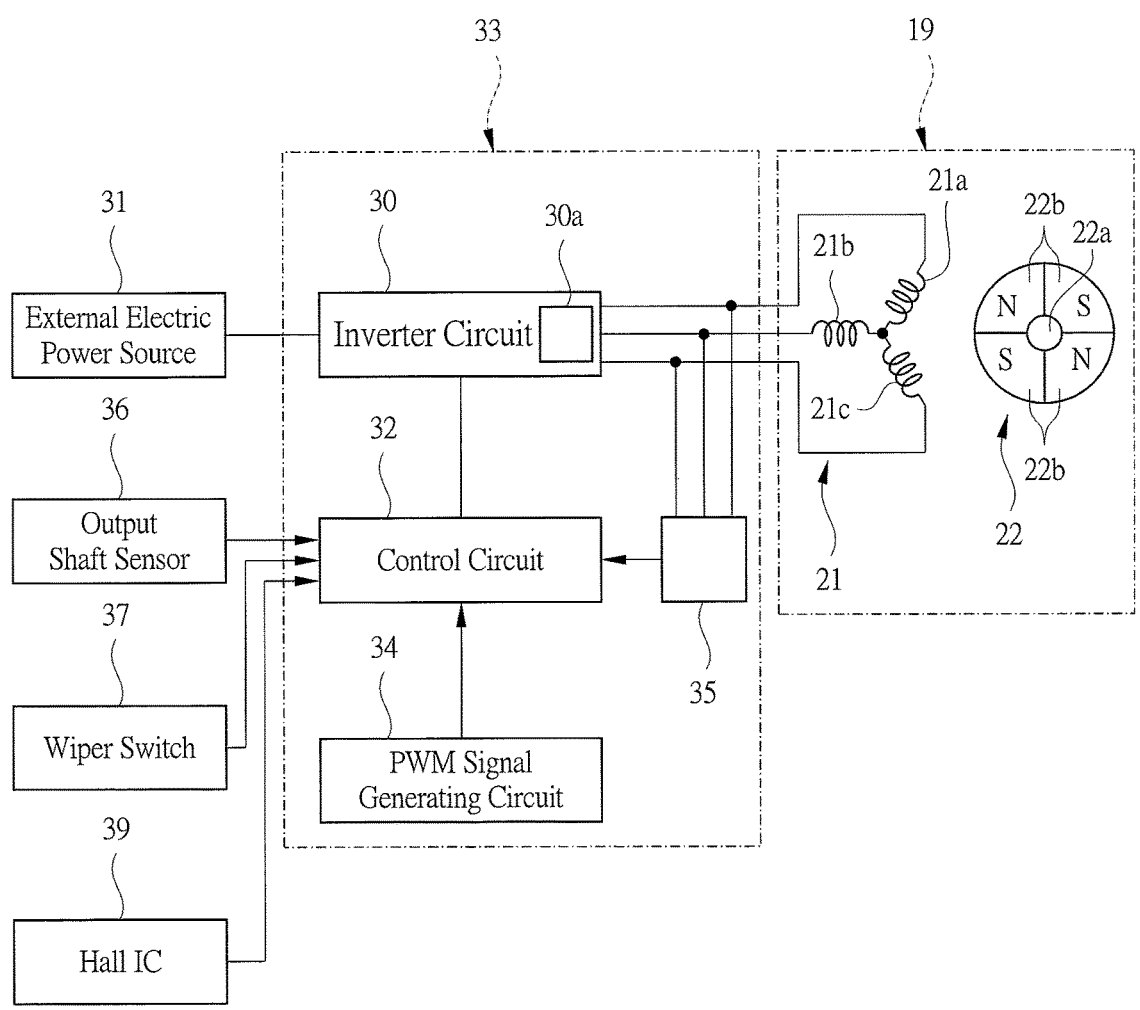
FIG. 4 is a block diagram showing a control system of the brushless motor according to the present invention.

The brushless motor 19 is constructed as shown in FIGS. 2, 3 and 4. A three-phase four-pole brushless motor 19 is employed as the brushless motor 19 in this embodiment. The brushless motor 19 has a stator 21 and a rotor 22. The brushless motor 19 further has a closed-end cylindrical case 23, and the stator 21 is provided and fixed to the inner circumference of the case 23. As shown in FIG. 4, the stator 21 has three-phase, specifically, U, V, and W-phase armature coils 21a, 21b, and 21c. The rotor 22 is provided inside the stator 21, and the rotor 22 has: a rotating shaft 22a; and four-pole permanent magnets 22b mounted on the rotating shaft 22a. A plurality of shaft bearings (not shown) is provided inside the case 23, and the rotating shaft 22a is rotatably supported by the bearings.

Furthermore, the brushless motor 19 further has a hollow frame 24, and the frame 24 and the case 23 are fixed by a fastening member (not shown). A substantially half part of the rotating shaft 22a in a length direction is located inside the case 23, and the remaining part of the rotating shaft 22a is located inside the frame 24. A worm 22c is formed on the outer circumference of said part of the rotating shaft 22a, located inside the case 23. A worm wheel 25 is provided inside the frame 24. A gear 25a is formed on the outer circumference of this worm wheel 25, and the gear 25a and the worm 22c are engaged with each other. Furthermore, a sensor magnet 38 is mounted on said remaining part of the rotating shaft 22a, located inside the frame 24. The sensor magnet 38 rotates integrally with the rotating shaft 22a. The sensor magnet 38 is magnetized so that N poles and S poles are alternately arranged along a circumferential direction of the rotating shaft 22a.

Furthermore, the worm wheel 25 is configured to rotate integrally with an output shaft 26. The worm 22c and the gear 25a collectively constitute a speed reduction mechanism 27 in this embodiment. This speed reduction mechanism 27 is a mechanism for reducing the rotation number of the output shaft 26 (output rotation number) relative to the rotation number of the rotor 22 (input rotation number) when the drive power of the rotor 22 is transmitted to the output shaft 26. Furthermore, in FIG. 2, an upper part of the frame 24 is provided with a shaft hole (not shown). The worm wheel 25 is fixed to one end part of the output shaft 26, the other end part of the output shaft 26 is exposed to the outside via the shaft hole of the frame 24, and coupled to the drive power transmission mechanism 20 as shown in FIG. 1.

An opening 24a is provided to the opposite side part of the frame 24 from the shaft hole. This opening 24a is formed in order to install the worm wheel 25 and the like in the frame 24. Furthermore, an undercover 28 for closing the opening 24a is provided to the frame 24. The undercover 28 has a tray shape, and a control board 29 is provided in a space surrounded by the undercover 28 and the frame 24. One example in which the control board 29 is mounted on the undercover 28 is shown in FIG. 2.

As shown in FIG. 4, this control board 29 is provided with a driving device 33 for controlling the brushless motor 19. The driving device 33 has an inverter circuit 30 for controlling energization for each of the armature coils 21a, 21b, and 21c. The inverter circuit 30 is connected to a terminal (not shown). The frame 24 is provided with a connector (not shown), and by inserting a socket (not shown) of an electric wire connected to an external electric power source 31 into the connector, the external electric power source 31 and the inverter circuit 30 are connected to each other. The external electric power source 31 is a battery, capacitor, or the like mounted on the vehicle 10.

Furthermore, the inverter circuit 30 is provided with a switching element 30a for connecting the armature coils 21a, 21b, and 21c to the external electric power source 31, and disconnecting them from the external electric power source 31. This switching element 30a is composed of, for example, a semiconductor device such as an FET. More specifically, the switching element 30a includes three positive-side switching elements corresponding to the U, V, and W-phase and connected to the positive pole of the external electric power source 31, and three negative-side switching elements corresponding to the U, V, and W-phase and connected to the negative-side of the external electric power source 31. When the switching element 30a is connected (turned ON), a current is supplied from the external electric power source 31 to the armature coils 21a, 21b, and 21c. In contrast, when the switching element 30a is interrupted (turned OFF), a current is not supplied from the external electric power source 31 to the armature coils 21a, 21b, and 21c. Furthermore, a control circuit (controller) 32 having a function of switching control between ON and OFF of the switching element 30a is connected to the inverter circuit 30.

This control circuit 32 is a known microcomputer including a CPU, a RAM, a ROM, and the like. The driving device 33 further has a PWM signal generating circuit 34, and a signal from the PWM signal generating circuit 34 is inputted to the control circuit 32. This control circuit 32 outputs a driving signal for controlling three negative-side switching elements, and a PWM signal is superimposed on this driving signal. That is, the three negative-side switching elements are driven by PWM control, so that they are intermittently turned ON in each energizing period of time. And by controlling a ratio at which the three negative-side switching elements are separately turned ON, that is, a duty ratio, the current to be supplied to each of the armature coils 21a, 21b, and 21c can be controlled. That is, the energizing period of time in which electric power is supplied to the armature coils 21a, 21b, and 21c can be increased and decreased between 0% to 100% with respect to a whole energizable period of time. Furthermore, the control circuit 32 has stored therein data, program, etc., for control to be performed at the time of starting the brushless motor 19. The time of starting the brushless motor 19 is an initial time of rotating the brushless motor 19 at a standstill.

Furthermore, an induced voltage detecting unit 35 is connected to a non-wire-bound end of each of the armature coils 21a, 21b, and 21c. The induced voltage detecting unit 35 is a sensor which detects an induced voltage occurring at each of the armature coils 21a, 21b, and 21c in association with the rotation of the rotor 22, and a detection signal from the induced voltage detecting unit 35 is inputted to the control circuit 32. The control circuit 32 performs a process of estimating a rotating position of the rotor 22 (a phase in a rotating direction) on the basis of the detection signal inputted from the induced voltage detecting unit 35.

Furthermore, the brushless motor 19 in this embodiment performs switching control between ON and OFF of the switching element 30a to reverse the direction of energization with respect to the armature coils 21a, 21b, and 21c, thereby allowing the rotor 22 to rotate forward and backward.

Furthermore, an output shaft sensor 36, which detects at least one of the rotation number and an absolute position of the output shaft 26, is provided inside the frame 24. The absolute position means a rotation angle of the output shaft 26 with respect to a reference position. The reference position can be determined at any position within the range of 360 degrees. A detection signal from this output shaft sensor 36 is inputted to the control circuit 32. Furthermore, a Hall IC 39 is mounted on the control board 29. The Hall IC 39 is fixed so as to face the sensor magnet 38 in a noncontact manner. With the rotation of the rotor 22, the Hall IC 39 performs a switching operation with a change of the magnetic pole of the sensor magnet 38, generating a switching signal (an ON/OFF signal). The control circuit 32 can detect the rotation number (rotation speed) of the rotor 22 on the basis of the switching signal from the Hall IC 39. Furthermore, a wiper switch 37 is provided in the interior of the vehicle 10, and an operation signal from the wiper switch 37 is inputted to the control circuit 32.

In the wiper apparatus 12, the wiper switch 37 is operated by the intention of a driver on the basis of conditions such as the amount of rainfall, the amount of snowfall, etc., thereby allowing the wiping speed of the wiper arms 14 and 16 to be switched. When the amount of rainfall or the amount of snowfall is small, the driver can operate the wiper switch 37 to select a low-speed wiping mode for causing the wiper arms 14 and 16 to operate at a predetermined low speed. In contrast, when the amount of rainfall or the amount of snowfall is large, the driver can operate the wiper switch 37 to select a high-speed wiping mode for causing the wiper arms 14 and 16 to operate at a speed higher than the low speed. The driver determines whether the amount of rainfall or the amount of snow fall is large or small on the basis of his or her personal point of view, and there is no criterion for distinguishing whether the amount is large or small. And, patterns, data, arithmetic expressions, etc., regarding the low-speed wiping mode and the high-speed wiping mode are stored in advance in the control circuit 32 for controlling the switching element 30a.

Then, control over the brushless motor 19 in this embodiment will be described hereinafter. When the wiper switch 37 is operated to select the low-speed mode, the detection signal from the induced voltage detecting unit 35 is inputted to the control circuit 32. On the basis of the detection signal from the induced voltage detecting unit 35, the control circuit 32 estimates a rotating position (an angle in a rotating direction) of the rotor 22, and performs energization control on the basis of the rotating position of the rotor 22. That is, the positive-side switching elements are sequentially turned ON by an electrical angle of 120 degrees, and the negative-side switching elements with the phase different from that of the positive-side switching elements are sequentially turned ON by an electrical angle of 120 degrees, thereby switching energization of the armature coils 21a, 21b, and 21c of the respective phases to commutate a phase current.

With repetition of the above-described control, a revolving magnetic field is formed by the stator 21 to rotate the rotor 22. Furthermore, the brushless motor 19 has a characteristic in which the rotation number increases as the current value increases. Furthermore, the brushless motor 19 has a characteristic in which the torque decreases as the rotation number increases. When the low-speed wiping mode is selected, duty-ratio control is performed without performing field weakening control, thereby holding the actual rotation number of the rotor 22 close to the required rotation number. Furthermore, when the low-speed wiping mode is selected, a predetermined fixed value is used for energization timing for each of the armature coils 21a, 21b, and 21c.

On the other hand, when the high-speed wiping mode is selected, field weakening control is performed without changing the current to be supplied to the armature coils 21a, 21b, and 21c. the term "field weakening control" is intended to mean a control of weakening the magnetic field as much as possible, which is formed by supplying a current to the armature coils 21a, 21b, and 21c. As will be specifically described below, field weakening control is control of advancing the energization timing of the armature coils 21a, 21b, and 21c by 30 degrees (leading phase), compared with that of the low-speed wiping mode. That is, when the high-speed wiping mode is selected, the revolving magnetic field formed by the armature coils 21a, 21b, and 21c is weaker than the revolving magnetic field formed by the armature coils 21a, 21b, and 21c in the low-speed wiping mode. When this field weakening control is performed, a back electromotive force in the armature coils 21a, 21b, and 21c is decreased, and the rotation number of the rotor 22 is increased. In an advance angle, a relative relation between the armature coils and the permanent magnets in the rotating direction of the rotor 22 is represented by an electrical angle.

Figure 5:
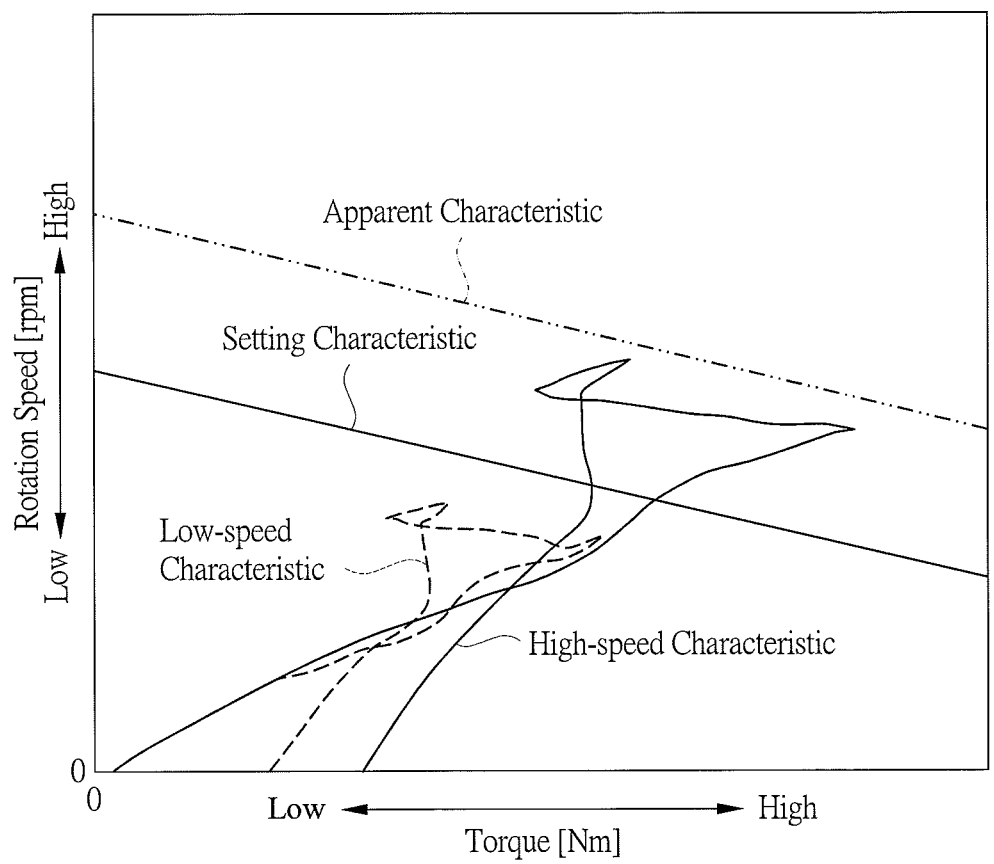
FIG. 5 is a diagram showing a relation between rotation number and torque in the brushless motor.

FIG. 5 is a diagram showing characteristics of the brushless motor 19. In FIG. 5, the vertical axis is the rotation number of the brushless motor 19, and the horizontal axis is the torque of the brushless motor 19. Furthermore, a broken line shown in FIG. 5 is an example of a low-speed characteristic corresponding to the low-speed wiping mode, and a solid line shown in FIG. 5 is an example of a high-speed characteristic corresponding to the high-speed wiping mode.

In the brushless motor 19 of this embodiment, in order to set its rating, a setting characteristic exists at, for example, a position indicated by the solid line so as to obtain the rotation number and torque corresponding to the low-speed characteristic of FIG. 5. Therefore, when the low-speed wiping mode is selected by an operation of the wiper switch 37, the required rotation number and torque can be obtained within a range equal to or lower than the setting characteristic.

In contrast, when the high-speed wiping mode is selected by an operation of the wiper switch 37 and the required rotation number and torque exceed the setting characteristic, the control circuit 32 performs field weakening control, thereby allowing the rotation number and torque exceeding the setting characteristic to be obtained. With this, the characteristic of the brushless motor 19 seemingly becomes equivalent to being positioned as indicated by a two-dot-chain line in FIG. 5. That is, in the brushless motor 19, the rating in design is determined with reference to the low-speed wiping mode, and the brushless motor 19 can be reduced in size as much as possible. And, torque can be increased by increasing the rotation number of the brushless motor 19 without changing the current value, which means that a torque constant is relatively increased. In other words, the brushless motor 19 of this embodiment can generate high torque as much as possible with less power consumption, thereby improving motor efficiency.

Figure 6:
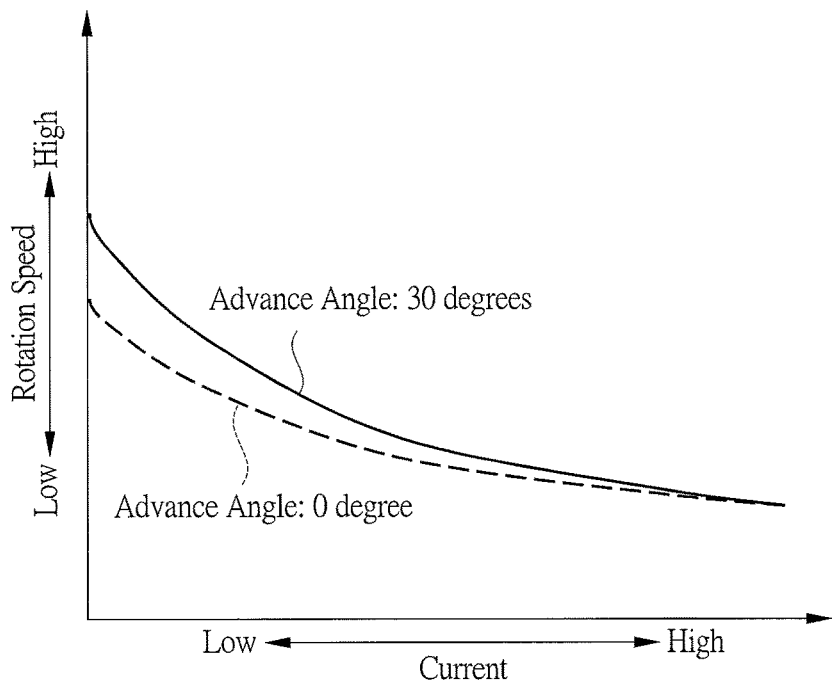
FIG. 6 is a diagram showing a relation between rotation number and advance angle in the brushless motor.
Figure 7:
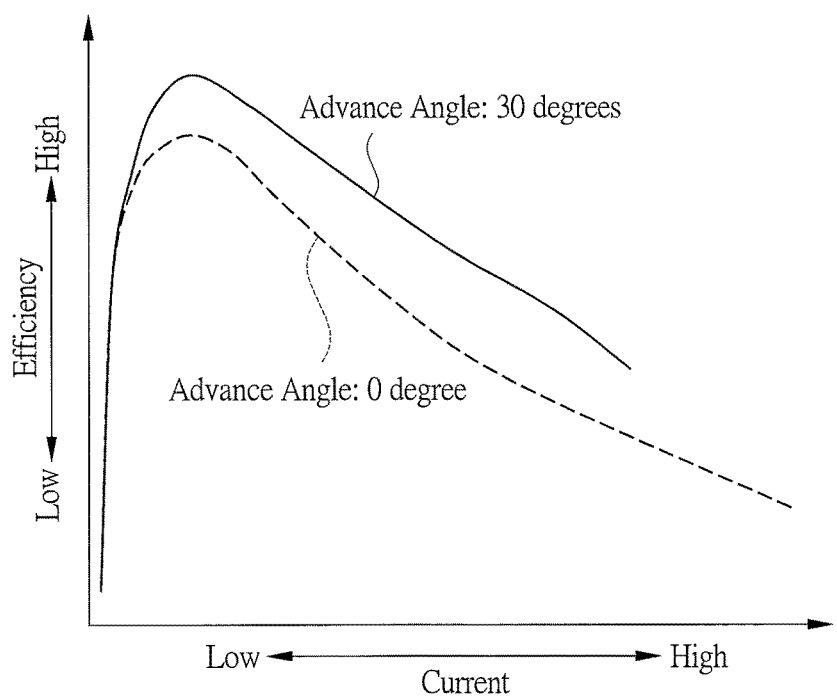
FIG. 7 is a diagram showing a relation between efficiency and advance angle in the brushless motor.

FIG. 6 is a diagram showing a relation between the advance angle as energization timing and the rotation number of the brushless motor 19. In FIG. 6, the horizontal axis represents current, and the vertical axis represents the rotation number. As shown in FIG. 6, the rotation number in the case of an advance angle of 30 degrees is larger than the rotation number in the case of an advance angle of 0 degree. The advance angle of 0 degree is a fixed value of energization timing described in the low-speed wiping mode. Furthermore, FIG. 7 is a diagram showing a relation between the advance angle as energization timing and the efficiency of the brushless motor 19. In FIG. 7, the horizontal axis represents current, and the vertical axis represents efficiency. As in FIG. 7, efficiency in the case of an advance angle of 30 degrees is higher than efficiency in the case of an advance angle of 0 degree.

Furthermore, in general, the low-speed wiping mode is higher in use frequency than the high-speed wiping mode in an automotive wiper apparatus. For this reason, when the brushless motor 19 of this embodiment is used in the wiper apparatus 12, the effect of reducing power consumption is large when the low-speed wiping mode is selected.

Furthermore, in the brushless motor 19 of this embodiment, when the field weakening control is performed, the rotating position of the rotor 22 can be estimated on the basis of the detection signal from the induced voltage detecting unit 35. Furthermore, in place of the detection signal from the induced voltage detecting unit 35, the rotating position of the rotor 22 can be estimated on the basis of the detection signal from the output shaft sensor 36 and the reduction ratio of the speed reduction mechanism 27. As just described, in the brushless motor 19 of this embodiment, the rotating position of the rotor 22 can be estimated by using the induced voltage detecting unit 35 and the output shaft sensor 36 provided in advance.

Furthermore, in the brushless motor 19 of this embodiment, the rotation number and a torque corresponding to the high-speed characteristic can be obtained by performing field weakening control, and the brushless motor 19 is provided with the speed reduction mechanism 27. Therefore, in the brushless motor 19, the reduction ratio of the speed reduction mechanism 27 can be set so that the characteristic, that is, the rotation number and the torque, suitable for the operating condition of the wiper arms 14 and 16 of the wiper apparatus 12 can be achieved. The reduction ratio of the speed reduction mechanism 27 is a value obtained by dividing the rotation number of the output shaft 26 by the rotation number of the rotor 22, and the rotation number of the output shaft 26 is decreased the reduction ratio of the speed reduction mechanism 27 is increased, the torque of the output shaft 26 can be amplified with respect to the torque of the rotor 22.

Furthermore, in the brushless motor 19 of this embodiment, an advance angle control at the time of forward and backward rotation of the brushless motor 19 can be optimized on the basis of the estimation of the rotating position of the rotor 22. Furthermore, since the brushless motor 19 of this embodiment is not provided with a brush, a commutator (commutator), etc., friction torque due to sliding between a brush and a commutator does not occur, thereby preventing a decrease in efficiency of the motor and an increase in temperature of the brush and avoiding restriction of motor output. Furthermore, in the brushless motor 19 of this embodiment, noise and operation sound due to the presence of the brush can be prevented, and silence can be ensured.

Furthermore, in the brushless motor 19 of this embodiment, both the control board 29 and the speed reduction mechanism 27 are provided in the space surrounded by the frame 24 and the undercover 28, that is, mechanically and electrically integral structure. Therefore, the entire brushless motor 19 can be configured as being compact, and layoutability when the brushless motor 19 is mounted on a vehicle body can be improved.

Furthermore, in the brushless motor 19 of this embodiment, when the high-speed mode is selected to perform field weakening control, the control circuit 32 performs control of detecting the rotation number of the rotor 22 on the basis of the ON/OFF signal from the Hall IC 39. Furthermore, the rotation number of the rotor 22 can be controlled by advancing the energization timing to the armature coils 21a, 21b, and 21c by an electrical angle of 30 degrees.

In particular, in the wiper apparatus 12, a time required from the time when the wiper arms 14 and 16 start operation from their initial positions to the time when they return via backward positions to the initial positions is desired to be kept constant. On the other hand, there is a possibility that, due to conditions such as wind resistance caused by vehicle speed and wiping resistances of the wiper blades 17 and 18, the actual wiping speed of the wiper arms 14 and 16 is changed to change the required time. Thus, concurrently with field weakening control, control of changing the duty ratio can be performed. As will be specifically described below, the control circuit 32 indirectly finds an actual wiping speed of the wiper arms 14 and 16 on the basis of the signal from the Hall IC 39. And, in performing feedback control, the control circuit 32 controls the duty ratio so that the actual wiping speed of the wiper arms 14 and 16 is close to a target wiping speed. With this, by controlling the duty ratio during a period from the time when previous energization timing control is performed to the time when next energization timing control is performed, the wiping speed of the wiper arms 14 and 16 can be finely controlled.

Here, a relation between the structure described in this embodiment and the structure of the present invention will be described. The driving device 33 having the control circuit 32 corresponds to a rotation speed control unit and a rotating direction control unit of the present invention, the frame 24 and the undercover 28 correspond to a housing of the present invention, the windshield 11 corresponds to a windshield of the present invention, the wiper arms 14 and 16 correspond to an operating member of the present invention, the switching element 30a corresponds to a switch of the present invention, and the Hall IC 39 corresponds to a rotation speed sensor of the present invention. Furthermore, the low-speed wiping mode corresponds to a first control mode of the present invention, and the high-speed wiping mode corresponds to a second control mode of the present invention.

It goes without saying that the present invention is not limited to the above-described embodiment, and can be variously modified within a range not deviating from the gist of the invention. For example, the wiper switch is not limited to the one operated by operation of the driver, and may be a detection switch having a function of detecting the amount of rainfall, the amount of snowfall, etc. With the structured described above, the rotation speed control unit automatically starts the wiper apparatus on the basis of the amount of rainfall, the amount of snowfall, etc., and performs control of automatically switching between the low-speed mode and the high-speed mode. In this case, the rotation speed control unit has stored in advance therein data such as the amount of rainfall, the amount of snowfall, etc., which serve as a reference for switching between the low-speed mode and the high-speed mode. Furthermore, the number of armature coils and the number of permanent magnets can be changed at will.

Furthermore, the wiper apparatus is not limited to the one which wipes the front windshield, but may be one which wipes a rear windshield. Furthermore, the wiper apparatus may have a structure in which the wiper arms swing by taking the output shaft as a pivot. Furthermore, the wiper apparatus may be configured so that the two wiper arms are respectively driven by separate brushless motors. Furthermore, the brushless motor of this embodiment may be an IPM (Interior Permanent Magnet)-type motor with a structure having permanent magnets buried in an iron core.

Furthermore, the number of modes that can be selected by the wiper switch are not limited to two, that is, the low-speed wiping mode and the high-speed wiping mode, but may be three or more. For example, the number of modes for controlling the rotation number of the rotor may be three, that is, a low-speed wiping mode, an intermediate-speed wiping mode, and a high-speed wiping mode. Here, the rotation number of the rotor in the middle-speed wiping mode is larger than the rotation number of the rotor in the low-speed wiping mode, and is smaller than the rotation number of the rotor in the high-speed wiping mode.

And, when the low-speed wiping mode is selected from among three wiping modes, the rotation speed control unit supplies a current to the armature coils at predetermined energization timing, and controls the duty ratio, which is an ON ratio of the switching element, to control the rotation number of the rotor. Furthermore, when the intermediate-speed wiping control mode is selected, a current is supplied to the armature coils at an energization timing obtained by advancing more than the energization timing when the low-speed wiping control mode is selected. With this, field weakening control of weakening the revolving magnetic field formed by the armature coils more than that when the low-speed wiping control mode is selected, thereby allowing the rotation number of the rotor to be controlled. As such, when the rotation number of the rotor is varied between the low-speed wiping mode and the intermediate-speed wiping mode, the low-speed wiping mode corresponds to the first control mode in the present invention, and the intermediate-speed wiping mode corresponds to the second control mode in the present invention.

On the other hand, when the intermediate-speed wiping mode is selected from among three wiping modes, the rotation speed control unit supplies a current to the armature coils at predetermined energization timing, and controls the duty ratio which is an ON ratio of the switching element, to control the rotation number of the rotor. In contrast, when the high-speed wiping control mode is selected, a current is supplied to the armature coils at an energization timing obtained by advancing more than the energization timing when the intermediate-speed wiping control mode is selected. With this, field weakening control of weakening the revolving magnetic field formed by the armature coils more than that when the intermediate-speed wiping control mode is selected, thereby allowing the rotation number of the rotor to be controlled. As such, when the rotation number of the rotor is varied between the intermediate-speed wiping mode and the high-speed wiping mode, the intermediate-speed wiping mode corresponds to the first control mode in the present invention, and the high-speed wiping mode corresponds to the second control mode in the present invention.

Furthermore, the brushless motor of the present invention can be applied to an inner rotor type brushless motor having the rotor located inside the stator or an outer rotor type brushless motor having the rotor placed outside the stator. Furthermore, the brushless motor of this embodiment can be used in a convenient-and-comfortable-type device provided in a vehicle, for example, a power sliding door device, a sun roof device, or a power window device, as a drive power source for operating an operating member such as door, roof, or glass.

Hereinafter, another embodiment of the present invention will be described in detail with reference to the drawings. A vehicle 110 shown in FIG. 8 has a windshield 111. The vehicle 110 further has a wiper apparatus 112 for wiping the windshield 111. The wiper apparatus 112 has: a wiper arm 114 which swings on a pivot shaft 113; and a wiper arm 116 which swings on a pivot shaft 115. A wiper blade 117 is mounted on a free end of the wiper arm 114, and a wiper blade 118 is mounted on a free end of the wiper arm 116. The wiper apparatus 112 further has a brushless motor 119 as a drive power source for driving the wiper arms 114 and 116. In this embodiment, the drive power of the brushless motor 119 is transmitted to the wiper arms 114 and 116 via a drive power transmission mechanism 120 composed of parts such as levers and links.

Figure 9:
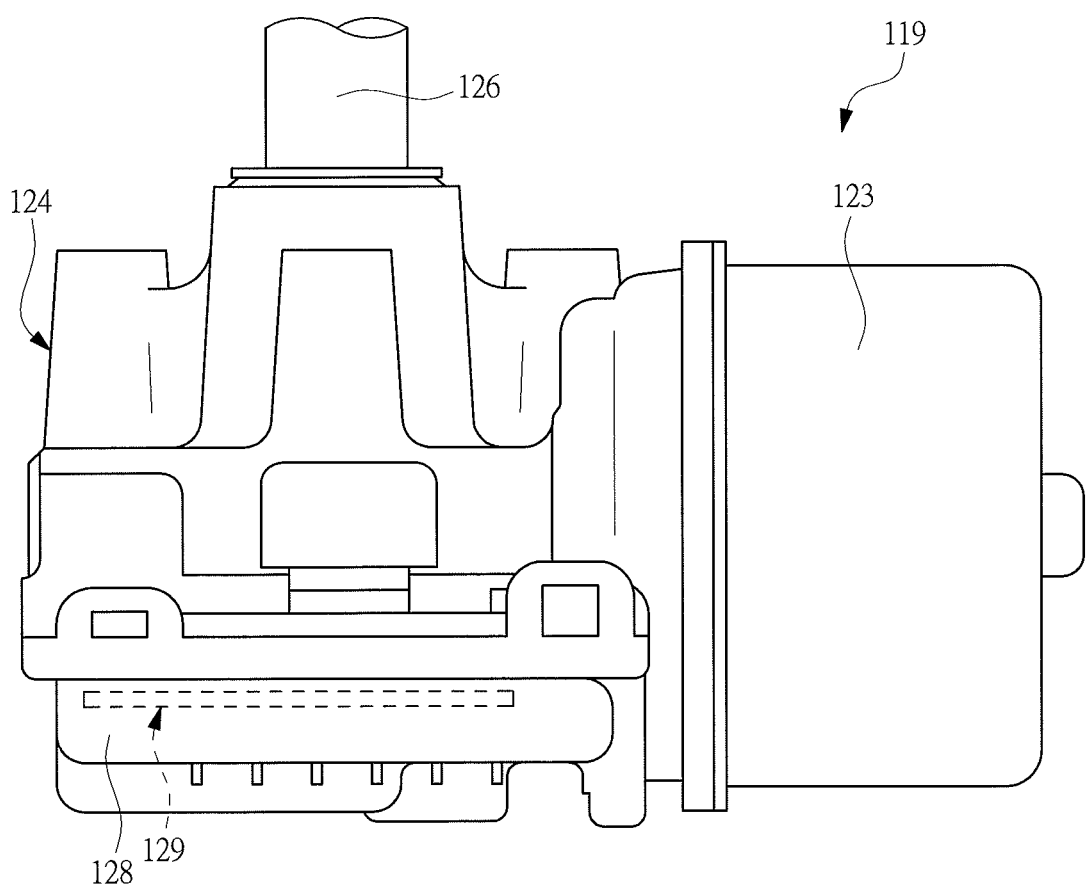
FIG. 9 is an external view showing the brushless motor according to the present invention.
Figure 10:
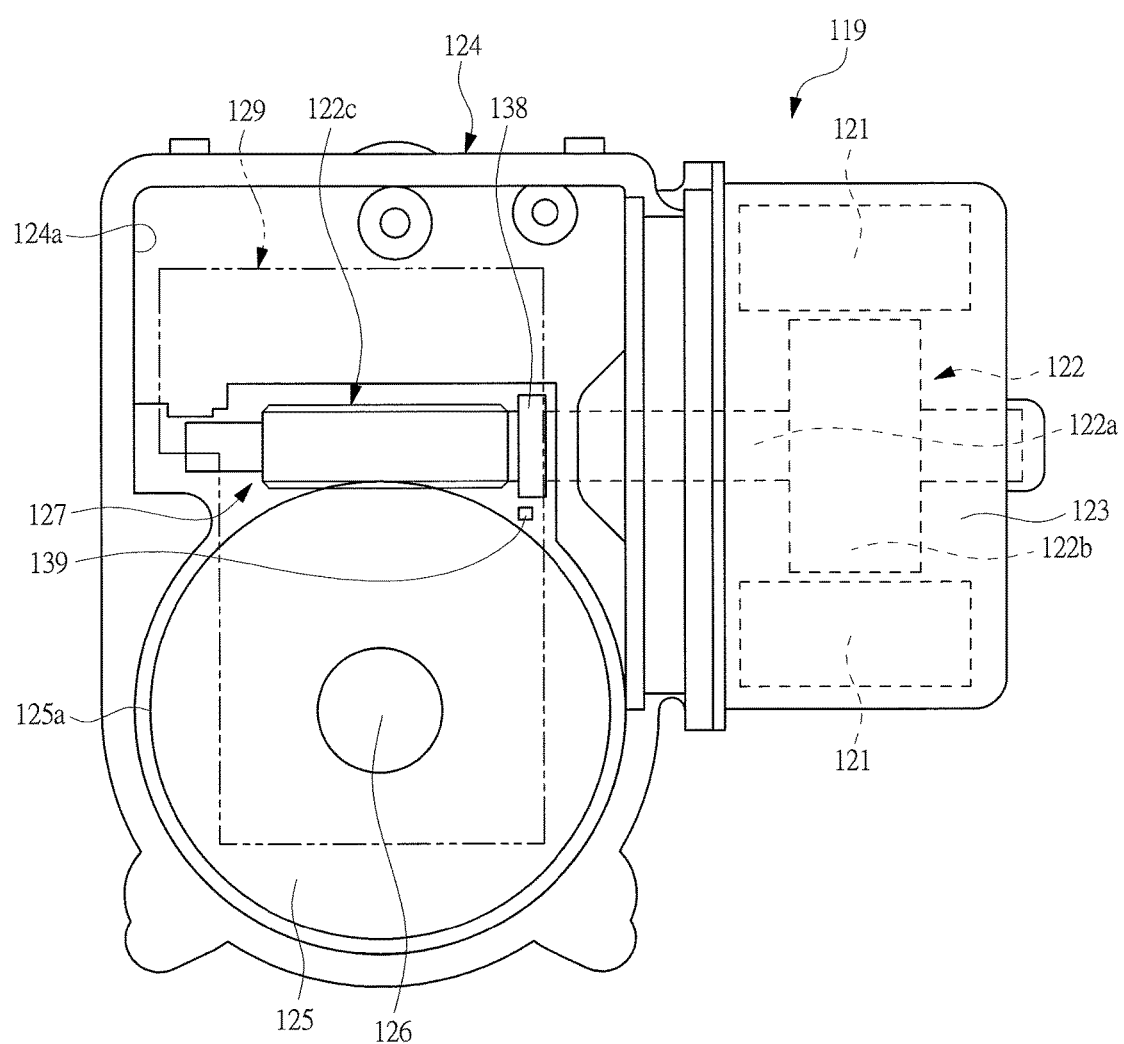
FIG. 10 is a bottom view showing the brushless motor according to the present invention with an undercover removed.
Figure 11:
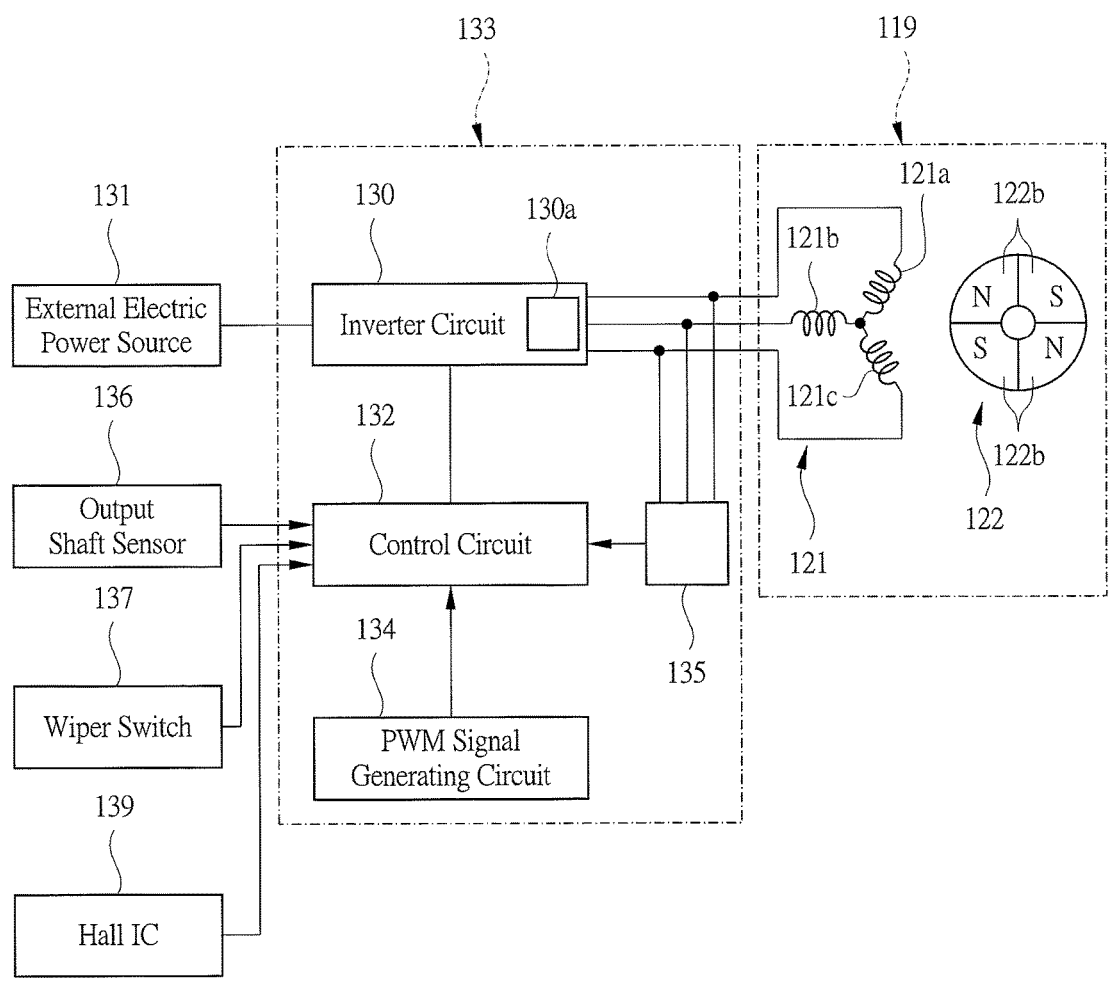
FIG. 11 is a block diagram showing a control system of the brushless motor according to the present invention.

The brushless motor 119 is constructed as shown in FIGS. 9, 10 and 11. A three-phase four-pole brushless motor 119 is employed as the brushless motor 119 in this embodiment. The brushless motor 119 has a stator 121 and a rotor 122. The brushless motor 119 further has a closed-end cylindrical case 123, and the stator 121 is provided and fixed to the inner circumference of the case 123. As shown in FIG. 11, the stator 121 has three-phase, specifically, U, V, and W-phase armature coils 121a, 121b, and 121c. As shown in FIG. 10, the rotor 122 is provided inside the stator 121. The rotor 122 has: a rotating shaft 122a; and four-pole permanent magnets 122b mounted on the rotating shaft 122a. Additionally, in FIG. 4, for sake of simplicity, the rotating shaft 122 is omitted. A plurality of shaft bearings (not shown) is provided inside the case 123, and the rotating shaft 122a is rotatably supported by the bearings.

Furthermore, the brushless motor 119 further has a hollow frame 124, and the frame 124 and the case 123 are fixed by a fastening member (not shown). A substantially half part of the rotating shaft 122a in a length direction is located inside the case 123, and the remaining part of the rotating shaft 122a is located inside the frame 124. A worm 122c is formed on the outer circumference of said part of the rotating shaft 122a, located inside the case 123. A worm wheel 125 is provided inside the frame 124. A gear 125a is formed on the outer circumference of this worm wheel 125, and the gear 125a and the worm 122c are engaged with each other. Furthermore, a sensor magnet 138 is mounted on said remaining part of the rotating shaft 122a, located inside the frame 124. The sensor magnet 138 rotates integrally with the rotating shaft 122a. The sensor magnet 138 is magnetized so that N poles and S poles are alternately arranged along a circumferential direction of the rotating shaft 122a.

Figure 8:
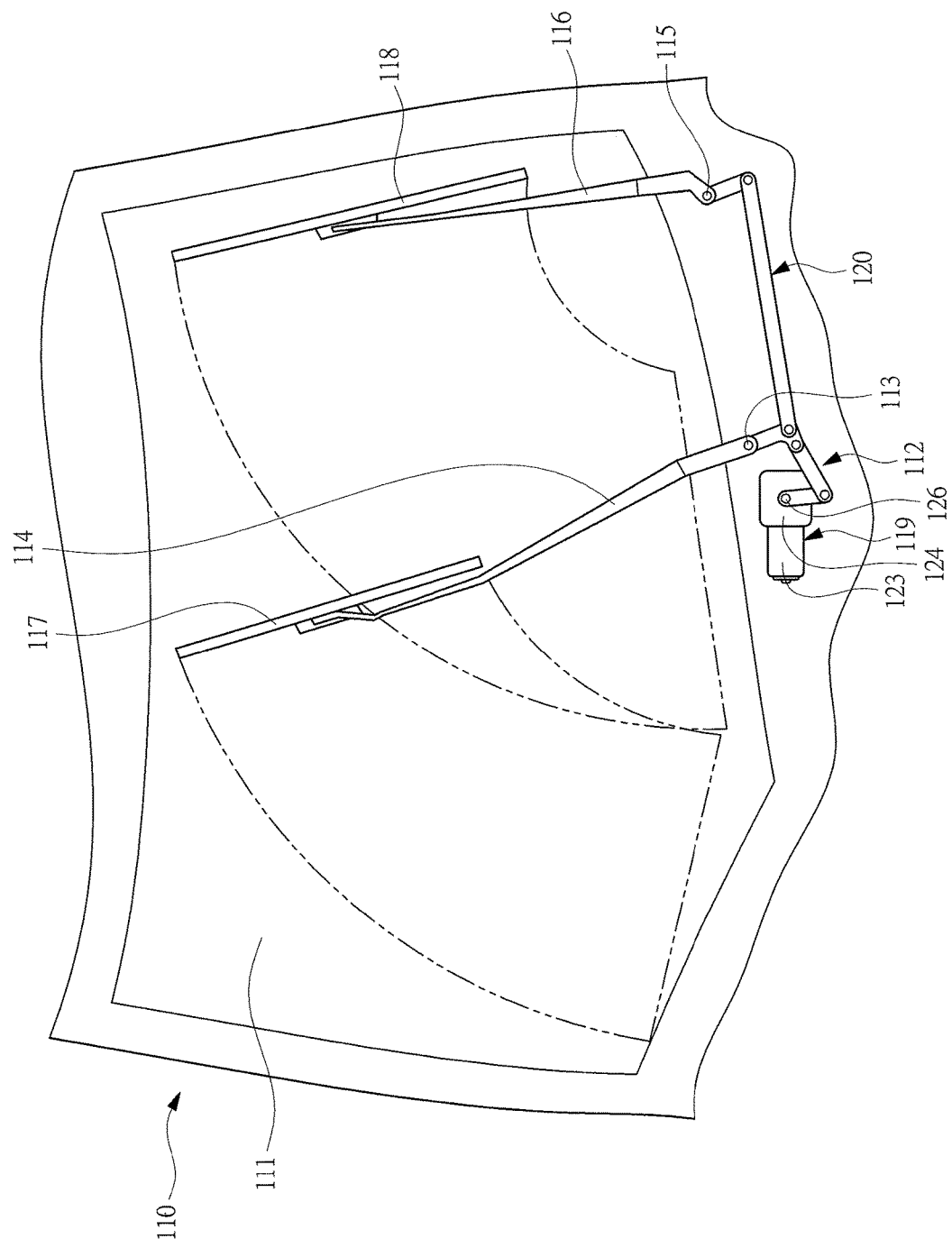
FIG. 8 is a schematic view showing another example in which a brushless motor according to the present invention is applied to a wiper apparatus of a vehicle.

Furthermore, the worm wheel 125 is configured to rotate integrally with an output shaft 126. The worm 122c and the gear 125a collectively constitute a speed reduction mechanism 127 in this embodiment. The reduction ratio of this speed reduction mechanism 127 is a mechanism for reducing the rotation speed of the output shaft 126 relative to the rotation speed of the rotor 122 when the drive power of the rotor 122 is transmitted to the output shaft 126. Furthermore, in FIG. 9, an upper part of the frame 124 is provided with a shaft hole (not shown). The worm wheel 125 is fixed to one end part of the output shaft 126, the other end part of the output shaft 126 is exposed to the outside via the shaft hole of the frame 124, and coupled to the drive power transmission mechanism 120 as shown in FIG. 8.

An opening 124a is provided to the opposite side part of the frame 124 from the shaft hole. This opening 124a is formed in order to install the worm wheel 125 and the like in the frame 124. Furthermore, an undercover 128 for closing the opening 124a is provided to the frame 124. The undercover 128 has a tray shape, and a control board 129 is provided in a space surrounded by the undercover 128 and the frame 124. One example in which the control board 129 is mounted on the undercover 128 is shown in FIG. 8.

As shown in FIG. 11, this control board 129 is provided with a driving device 133 for controlling the brushless motor 119. The driving device 133 has an inverter circuit 130 for controlling energization for each of the armature coils 121a, 121b, and 121c. The inverter circuit 130 is connected to a terminal (not shown). The frame 124 is provided with a connector (not shown), and by inserting a socket (not shown) of an electric wire connected to an external electric power source 131 into the connector, the external electric power source 131 and the inverter circuit 130 are connected to each other. The external electric power source 131 is a battery, capacitor, or the like mounted on the vehicle 110.

Furthermore, the inverter circuit 130 is provided with a switching element 130a for connecting the armature coils 121a, 121b, and 121c to the external electric power source 131, and disconnecting them from the external electric power source 131. This switching element 130a is composed of, for example, a semiconductor device such as an FET. More specifically, the switching element 130a includes three positive-side switching elements corresponding to the U, V, and W-phase and connected to the positive pole of the external electric power source 131, and three switching elements corresponding to the U, V, and W-phase and connected to the negative-side of the external electric power source 131. Furthermore, a control circuit (controller) 132 having a function of switching control between ON and OFF of the switching element 130*a* is connected to the inverter circuit 130.

This control circuit 132 is a known microcomputer including a CPU, a RAM, a ROM, and the like. The driving device 133 further has a PWM signal generating circuit 134, and a signal from the PWM signal generating circuit 134 is inputted to the control circuit 132. This control circuit 132 outputs a driving signal for controlling three negative-side switching elements, and a PWM signal is superimposed on this driving signal. That is, the three negative-side switching elements are driven by PWM control, so that they are intermittently turned ON in each energizing period of time. And by controlling a ratio at which the three negative-side switching elements are separately turned ON, that is, a duty ratio, the current to be supplied to each of the armature coils 121*a*, 121*b*, and 121*c* can be controlled. Furthermore, the control circuit 132 has stored therein data, program, etc., for control to be performed at the time of starting the brushless motor 119. The time of starting the brushless motor 119 is an initial time of rotating the brushless motor 119 at a standstill.

Furthermore, an induced voltage detecting unit 135 is connected to a non-wire-bound end of each of the armature coils 121*a*, 121*b*, and 121*c*. The induced voltage detecting unit 135 is a sensor which detects an induced voltage occurring at each of the armature coils 121*a*, 121*b*, and 121*c* in association with the rotation of the rotor 122, and a detection signal from the induced voltage detecting unit 135 is inputted to the control circuit 132. The control circuit 132 performs a process of estimating a rotating position of the rotor 122 (a phase in a rotating direction) on the basis of the detection signal inputted from the induced voltage detecting unit 135.

Furthermore, the brushless motor 119 in this embodiment performs switching control between ON and OFF of the switching element 130*a* to reverse the direction of energization with respect to the armature coils 121*a*, 121*b*, and 121*c*, thereby allowing the rotor 122 to rotate forward and backward. When the switching element 130*a* is turned ON, the external electric power source 131 is connected to the armature coils 121*a*, 121*b*, and 121*c*, and when the switching element 130*a* is turned OFF, the external electric power source 131 is disconnected to the armature coils 121*a*, 121*b*, and 121*c*.

Furthermore, an output shaft sensor 136, which detects at least one of the rotation number and an absolute position of the output shaft 126, is provided inside the frame 124. The absolute position means a rotation angle of the output shaft 126 with respect to a reference position. The reference position can be determined at any position within the range of 360 degrees. A detection signal from this output shaft sensor 136 is inputted to the control circuit 132. Furthermore, a Hall IC 139 is mounted on the control board 129. The Hall IC 139 is fixed so as to face the sensor magnet 138 in a noncontact manner. With the rotation of the rotor 122, the Hall IC 139 performs a switching operation with a change of the magnetic pole of the sensor magnet 138, generating a switching signal (an ON/OFF signal). The control circuit 132 can detect the rotation number (rotation speed) of the rotor 122 on the basis of the switching signal from the Hall IC 139. Furthermore, a wiper switch 137 is provided in the interior of the vehicle 110, and an operation signal from the wiper switch 137 is inputted to the control circuit 132.

In the wiper apparatus 112, on the basis of conditions such as the amount of rainfall, the amount of snowfall, etc., the wiping speed of the wiper arms 114 and 116 can be switched. For example, when the amount of rainfall or the amount of snowfall is small, the wiper switch 137 is operated to select a low-speed wiping mode for causing the wiper arms 114 and 116 to operate at a predetermined low speed. In contrast, when the amount of rainfall or the amount of snowfall is large, the wiper switch 137 is operated to select a high-speed wiping mode for causing the wiper arms 114 and 116 to operate at a speed higher than the low speed. For this reason, patterns, data, arithmetic expressions, etc., regarding the low-speed wiping mode and the high-speed wiping mode are stored in advance in the control circuit 132 for controlling the switching element 130*a*.

Then, control over the brushless motor 119 in this embodiment will be described hereinafter. When the wiper switch 137 is operated to select the low-speed mode, the detection signal from the induced voltage detecting unit 135 is inputted to the control circuit 132. On the basis of the detection signal from the induced voltage detecting unit 135, the control circuit 132 estimates a rotating position (an angle in a rotating direction) of the rotor 122, and performs energization control on the basis of the rotating position of the rotor 122. That is, the positive-side switching elements are sequentially turned ON by an electrical angle of 120 degrees, and the negative-side switching elements with the phase different from that of the positive-side switching elements are sequentially turned ON by an electrical angle of 120 degrees, thereby switching energization of the armature coils 121*a*, 121*b*, and 121*c* of the respective phases to commutate a phase current.

With repetition of the above-described control, a revolving magnetic field is formed by the stator 121 to rotate the rotor 122. Furthermore, the brushless motor 119 has a characteristic in which the rotation number increases as the current value increases. Furthermore, the brushless motor 119 has a characteristic in which the torque decreases as the rotation number increases. When the low-speed wiping mode is selected, duty-ratio control is performed without performing field weakening control, thereby holding the actual rotation number of the rotor 122 close to the required rotation number.

On the other hand, when the high-speed wiping mode is selected, field weakening control is performed without changing the current to be supplied to the armature coils 121*a*, 121*b*, and 121*c*. In the field weakening control, energization timing for each of the armature coils 121*a*, 121*b*, and 121*c* is advanced by an electrical angle of 30 degrees with respect to that of the low-speed wiping mode. The term "field weakening control" is intended to mean a control of weakening the magnetic field as much as possible, which is formed by supplying a current to the armature coils 121*a*, 121*b*, and 121*c*. When this field weakening control is performed, a back electromotive force in the armature coils 121*a*, 121*b*, and 121*c* is decreased, and the rotation number of the rotor 122 is increased.

Figure 12:
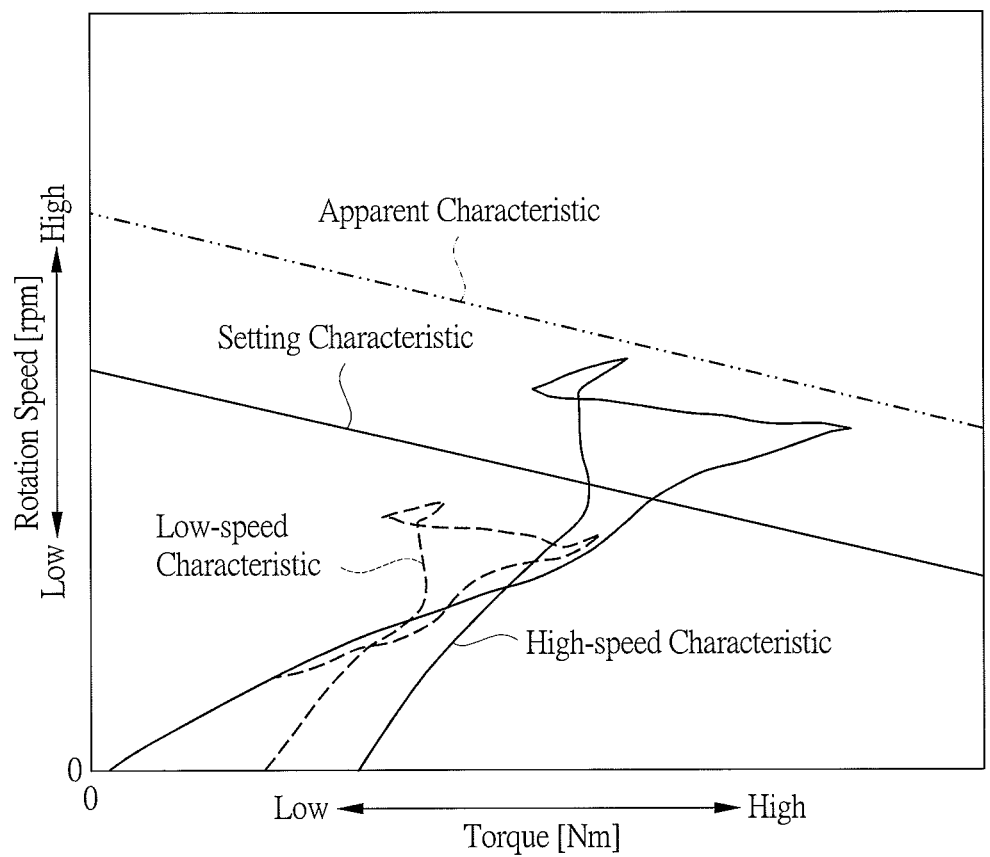
FIG. 12 is a diagram showing one example of characteristics of the brushless motor according to the present invention.

FIG. 12 is a diagram showing characteristics of the brushless motor 119. In FIG. 12, the vertical axis is the rotation number of the brushless motor 119, and the horizontal axis is the torque of the brushless motor 119. Furthermore, a broken line shown in FIG. 12 is an example of a low-speed characteristic corresponding to the low-speed wiping mode, and a solid line shown in FIG. 12 is an example of a high-speed characteristic corresponding to the high-speed wiping mode.

In the brushless motor 119 of this embodiment, in order to set its rating, a setting characteristic exists at, for example, a position indicated by the solid line so as to obtain the rotation number and torque corresponding to the low-speed characteristic of FIG. 12. Therefore, when the low-speed wiping mode is selected by an operation of the wiper switch 137, the required rotation number and torque can be obtained within a range equal to or lower than the setting characteristic.

In contrast, when the high-speed wiping mode is selected by an operation of the wiper switch 137 and the required rotation number and torque exceed the setting characteristic, the control circuit 132 performs field weakening control, thereby allowing the rotation number and torque exceeding the setting characteristic to be obtained. With this, the characteristic of the brushless motor 119 seemingly becomes equivalent to being positioned as indicated by a two-dot-chain line in FIG. 12. And, torque can be increased by increasing the rotation number of the brushless motor 119 without changing the current value, which means that a torque constant is relatively increased. In other words, the brushless motor 119 of this embodiment can generate high torque as much as possible with less power consumption, thereby improving motor efficiency.

Furthermore, in general, the low-speed wiping mode is higher in use frequency than the high-speed wiping mode in an automotive wiper apparatus. For this reason, when the brushless motor 119 of this embodiment is used in the wiper apparatus 112, the effect of reducing power consumption is large when the low-speed wiping mode is selected. In the brushless motor of this embodiment, it is not necessary to determine the rating in design of the brushless motor 119 with reference to the high-speed wiping mode, and the brushless motor 219 can be reduced in size as much as possible.

Furthermore, in the brushless motor 119 of this embodiment, when the field weakening control is performed, the rotating position of the rotor 122 can be estimated on the basis of the detection signal from the induced voltage detecting unit 135. Furthermore, in place of the detection signal from the induced voltage detecting unit 135, the rotating position of the rotor 122 can be estimated on the basis of the detection signal from the output shaft sensor 136 and the reduction ratio of the speed reduction mechanism 127. As just described, in the brushless motor 119 of this embodiment, the rotating position of the rotor 122 can be estimated by using the induced voltage detecting unit 135 and the output shaft sensor 136 provided in advance. It is not necessary to provide a special sensor for detecting a rotating position of the rotor 22, that is, the brushless motor of this embodiment has a sensorless structure. Therefore, the brushless motor of this embodiment can be reduced in the number of parts and production cost.

Furthermore, in the brushless motor 119 of this embodiment, the rotation number and a torque corresponding to the high-speed characteristic can be obtained by performing field weakening control, and the brushless motor 119 is provided with the speed reduction mechanism 127. Therefore, in the brushless motor 119, the reduction ratio of the speed reduction mechanism 127 can be set so that the characteristic, that is, the rotation number and the torque, suitable for the operating condition of the wiper arms 114 and 116 of the wiper apparatus 112 can be achieved. The reduction ratio of the speed reduction mechanism 127 is a value obtained by dividing the rotation number of the output shaft 126 by the rotation number of the rotor 122, and the rotation number of the output shaft 126 is decreased, the reduction ratio of the speed reduction mechanism 127 is increased.

Furthermore, in the brushless motor 119 of this embodiment, an advance angle control at the time of forward and backward rotation of the brushless motor 119 can be optimized on the basis of the estimation of the rotating position of the rotor 122. Furthermore, since the brushless motor 119 of this embodiment is not provided with a brush, a commutator (commutator), etc., friction torque due to sliding between a brush and a commutator does not occur, thereby preventing a decrease in efficiency of the motor. Furthermore, in the brushless motor 119 of this embodiment, noise due to the presence of the brush can be prevented.

Furthermore, the brushless motor 119 of this embodiment has a structure in which both the control board 129 and the speed reduction mechanism 127 are placed in the space surrounded by the frame 124 and the undercover 128, that is, a mechanically and electrically integral structure. Therefore, the entire brushless motor 119 can be configured as being compact, and layoutability when the brushless motor 119 is mounted on a vehicle body can be improved.

Furthermore, in the brushless motor 119 of this embodiment, the control circuit 132 has a function of, when performing field weakening control, performing control of detecting the rotation number of the rotor 122 on the basis of the ON/OFF signal from the Hall IC 139 and controlling the rotation number of the rotor 122 by advancing the energization timing to the armature coils 121a, 121b, and 121c by an electrical angle of 30 degrees.

Here, a relation between the structure described in this embodiment and the structure of the present invention will be described. The driving device 133 having the control circuit 132 corresponds to a first rotation speed control unit, a second rotating direction control unit, a rotating position estimating unit, and a rotating direction control unit of the present invention; the frame 124 and the undercover 128 correspond to the housing of the present invention; the windshield 111 corresponds to the glass of the present invention; the wiper arms 114 and 116 correspond to the operating member of the present invention; and the Hall IC 139 corresponds to a switching element of the present invention. Furthermore, the characteristics represented by the rotation number and torque in FIG. 12 correspond to characteristics of the brushless motor in the present invention.

It goes without saying that the present invention is not limited to the above-described embodiment and can be variously modified within a range not deviating from the gist of the invention. For example, the wiper apparatus 112 is not limited to the one which wipes the windshield 111, but may be one which wipes a rear windshield. Furthermore, while the wiper arms 114 and 116 are coupled to the output shaft 126 via the drive power transmission mechanism 120 in the wiper apparatus 112 shown in FIG. 8, the wiper arms may be configured to be coupled directly to the output shaft. Furthermore, while the wiper apparatus 112 shown in FIG. 8 is configured in a manner such that the wiper arms 114 and 116 are driven by the single brushless motor 119, the two wiper arms may be configured to be respectively driven by separate brushless motors. Furthermore, the brushless motor of this embodiment may be an IPM (Interior Permanent Magnet)-type motor with a structure having permanent magnets buried in an iron core. Furthermore, the number of modes that can be selected by the wiper switch are not limited to two, that is, the low-speed wiping mode and the high-speed wiping mode, but may be three or more. Furthermore, the number of armature coils and the number of permanent magnets can be changed at will.

Furthermore, the brushless motor according to the present invention can be applied to a brushless motor in an inner rotor shape having a rotor located inside the stator or a brushless motor in an outer rotor shape having a rotor placed outside the stator. Furthermore, the brushless motor of this embodiment can be used in a convenient-and-comfortable-type device provided in a vehicle, for example, a power sliding door device, a sun roof device, or a power window device, as a drive power source for operating an operating member such as door, roof, or windshield.

Hereinafter, still another embodiment of the present invention will be described in detail with reference to the drawings. A vehicle 210 shown in FIG. 13 has a windshield 211. The vehicle 210 further has a wiper apparatus 12 for wiping the windshield 211. The wiper apparatus 212 has: a wiper arm 214 which swings on a pivot shaft 213; and a wiper arm 216 which swings on a pivot shaft 215. A wiper blade 217 is mounted on a free end of the wiper arm 214, and a wiper blade 218 is mounted on a free end of the wiper arm 216. The wiper apparatus 212 further has a brushless motor 219 as a drive power source for driving the wiper arms 214 and 216. In this embodiment, the drive power of the brushless motor 219 is transmitted to the wiper arms 214 and 216 via a drive power transmission mechanism 220 composed of parts such as levers and links.

Figure 14:
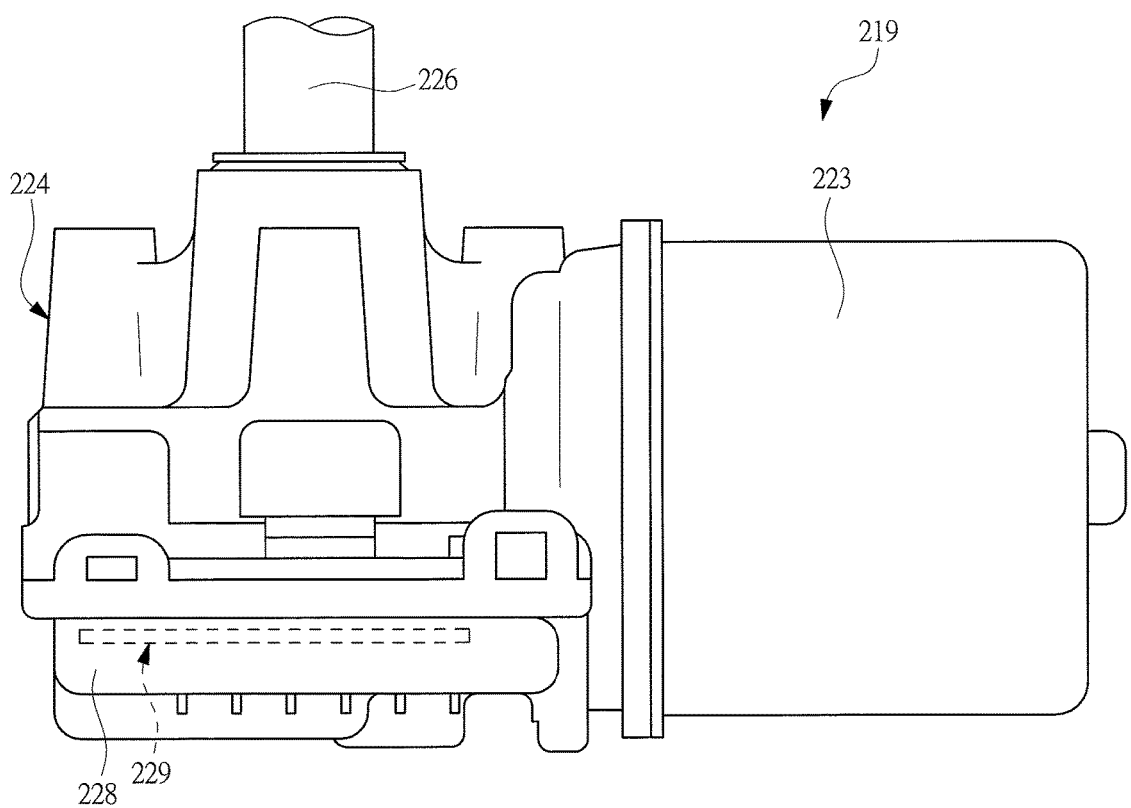
FIG. 14 is an external view showing the brushless motor according to the present invention.
Figure 15:
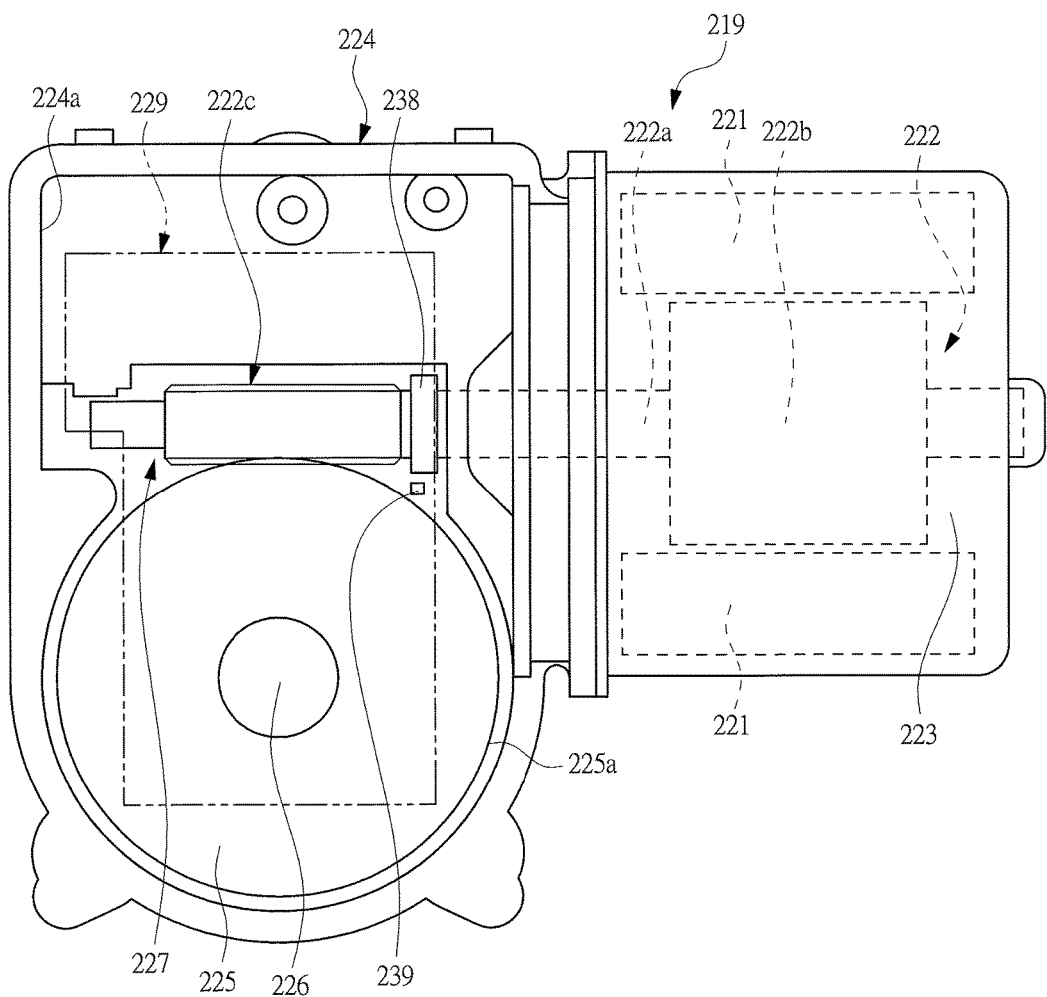
FIG. 15 is a bottom view showing the brushless motor according to the present invention with an undercover removed.
Figure 16:
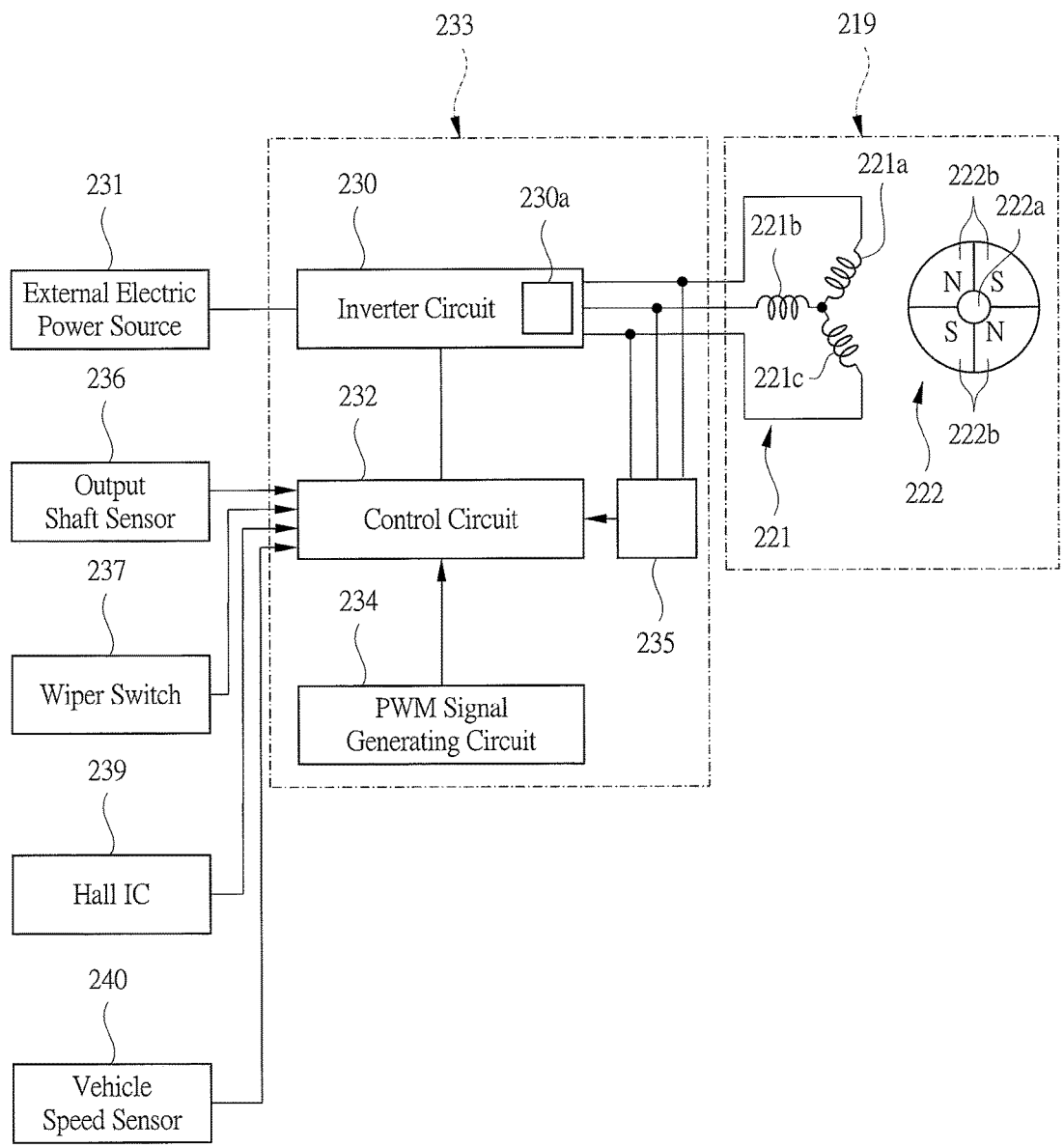
FIG. 16 is a block diagram showing a control system of the brushless motor according to the present invention.

The brushless motor 219 is constructed as shown in FIGS. 14, 15 and 16. The brushless motor 219 is a three-phase direct current motor 219, and a three-phase four-pole brushless motor 219 is employed as the brushless motor 219 in this embodiment. The brushless motor 219 has a stator 221 and a rotor 222. The brushless motor 219 further has a closed-end cylindrical case 223, and the stator 221 is provided and fixed to the inner circumference of the case 223. As shown in FIG. 16, the stator 221 has winding wires, that is, armature coils 221a, 221b, and 221c corresponding to three-phase, specifically, U, V, and W-phase. Specifically, three armature coils are connected to each other so as to form Y-connection, that is, one ends of the three-phase armature coils 221a are connected at a neutral point. Furthermore, this brushless motor 219 is a bipolar type brushless motor in which each of the armature coils functions as both positive and negative pole. The rotor 222 is provided inside the stator 221, and the rotor 222 has: a rotor shaft 222a; and four-pole permanent magnets 222b mounted on the rotor shaft 222a. A plurality of shaft bearings is provided inside the case 223, and the rotor shaft 222a is rotatably supported by the bearings.

Furthermore, the brushless motor 219 further has a hollow frame 224, and the frame 224 and the case 223 are fixed by a fastening member (not shown). A substantially half part of the rotor shaft 222a in a length direction is located inside the case 223, and the remaining part of the rotor shaft 222a is located inside the frame 224. A worm 222c is formed on the outer circumference of said part of the rotor shaft 222a, located inside the case 223. A worm wheel 225 is provided inside the frame 224. A gear 225a is formed on the outer circumference of this worm wheel 225, and the gear 225a and the worm 222c are engaged with each other. Furthermore, a sensor magnet 238 is mounted on said remaining part of the rotor shaft 222a, located inside the frame 224. The sensor magnet 238 rotates integrally with the rotor shaft 222a. The sensor magnet 238 is magnetized so that N poles and S poles are alternately arranged along a circumferential direction of the rotor shaft 222a.

Furthermore, the worm wheel 225 is configured to rotate integrally with an output shaft 226. The worm 222c and the gear 225a collectively constitute a speed reduction mechanism 227 in this embodiment. This speed reduction mechanism 227 is a mechanism for reducing the rotation number of the output shaft 226 (output rotation number) relative to the rotation number of the rotor 222 (input rotation number) when the drive power of the rotor 222 is transmitted to the output shaft 226. The rotation number of the rotor 222 is an input rotation number, and the rotation number of the output shaft is an output rotation number. Furthermore, in FIG. 14, an upper part of the frame 224 is provided with a shaft hole (not shown), and the output shaft 226 is inserted into the shaft hole. The worm wheel 225 is fixed to one end part of the output shaft 226, the other end part of the output shaft 226 is exposed to the outside of the frame 224, and coupled to the drive power transmission mechanism 220.

An opening 224a is provided to the opposite side part of the frame 224 from the shaft hole. This opening 224a is formed in order to install the worm wheel 225 and the like in the frame 224. Furthermore, an undercover 228 for closing the opening 224a is provided to the frame 224. The undercover 228 has a tray shape, and a control board 229 is provided in a space surrounded by the undercover 228 and the frame 224. One example in which the control board 229 is mounted on the undercover 228 is shown in FIG. 14.

As shown in FIG. 16, this control board 229 is provided with a control unit for controlling the brushless motor 219, that is, a driving device 233 as a controller. The driving device 233 has an inverter circuit 230 for controlling energization for each of the armature coils 221a, 221b, and 221c. The inverter circuit 230 is connected to a terminal (not shown). The frame 224 is provided with a connector, and by inserting a socket of an electric wire connected to an external electric power source 231 into the connector, the external electric power source 231 and the inverter circuit 230 are connected to each other. The external electric power source 231 is a battery, capacitor, or the like mounted on the vehicle 210.

Furthermore, the inverter circuit 230 is provided with a switching element 230a for connecting the armature coils 221a, 221b, and 221c to the external electric power source 231, and disconnecting them from the external electric power source 231. This switching element 230a is composed of, for example, a semiconductor device such as an FET. More specifically, the switching element 230a includes three positive-side switching elements corresponding to the U, V, and W-phase and connected to the positive pole of the external electric power source 231, and three negative-side switching elements corresponding to the U, V, and W-phase and connected to the negative-side of the external electric power source 231. That is, six switching elements are provided in all. When the switching element 230a is connected, that is, turned ON, a current is supplied from the external electric power source 231 to the armature coils 221a, 221b, and 221c. In contrast, when the switching element 230a is interrupted, that is, turned OFF, a current is not supplied from the external electric power source 231 to the armature coils 221a, 221b, and 221c. Furthermore, a control circuit 232 for switching between ON and OFF of the switching element 230a is connected to the inverter circuit 230.

This control circuit 232 is a known microcomputer including a CPU, a RAM, a ROM, and the like. The driving device 233 further has a PWM signal generating circuit 234, and a signal from the PWM signal generating circuit 234 is inputted to the control circuit 232. This control circuit 232 outputs a driving signal for controlling three negative-side switching elements, and a PWM signal is superimposed on this driving signal. That is, the three negative-side switching elements are driven by PWM control, so that they are intermittently turned ON in each energizing period of time. And by controlling a ratio at which the three negative-side switching elements are separately turned ON, that is, a duty ratio, the current to be supplied to each of the armature coils 221a, 221b, and 221c can be controlled. That is, the energizing period of time in which electric power is supplied to the armature coils 221a, 221b, and 221c can be increased and decreased between 0% to 100% with respect to a whole energizable period of time. Furthermore, the control circuit 232 has stored therein data, program, etc., for control to be performed at the time of starting the brushless motor 219. The time of starting the brushless motor 219 is an initial time of rotating the brushless motor 219 at a standstill.

Furthermore, an induced voltage detecting unit 235 is connected to a non-wire-bound end of each of the armature coils 221a, 221b, and 221c. The induced voltage detecting unit 235 is a sensor which detects an induced voltage occurring at each of the armature coils 221a, 221b, and 221c in association with the rotation of the rotor 222, and a detection signal from the induced voltage detecting unit 235 is inputted to the control circuit 232. The control circuit 232 performs a process of estimating a rotating position of the rotor 222, that is, a phase in a rotating direction on the basis of the detection signal inputted from the induced voltage detecting unit 235.

Furthermore, a Hall IC 239 is mounted on the control board 229. The Hall IC 239 is fixed so as to face the sensor magnet 239 in a non-contact manner. With the rotation of the rotor shaft 222a, the Hall IC 239 performs a switching operation with a change of the magnetic pole of the sensor magnet 238, generating a switching signal, that is, an ON/OFF signal. Note that a plurality of, for example, three, Hall ICs 239 can be provided along the rotating direction of the rotor shaft 222. The control circuit 232 detects the rotation number and the rotation angle of the rotor shaft 222 on the basis of the switching signal from the Hall IC 239. Furthermore, an output shaft sensor 236 which detects the rotation angle and the rotation number of the output shaft 226 is provided. A detection signal from the output shaft sensor 236 is inputted to the control circuit 232. Furthermore, a wiper switch 237 is provided in the interior of the vehicle 210, and the embodiment is configured so that an operation signal from the wiper switch 237 is inputted to the control circuit 232. Furthermore, a vehicle-speed sensor 240 is provided, and a signal from the vehicle-speed sensor 240 is inputted to the control circuit 232. The vehicle-speed sensor 240 is a sensor which detects a traveling speed of the vehicle 210.

Then, control over the brushless motor 219 in this embodiment will be described hereinafter. On the basis of the detection signal from the induced voltage detecting unit 235, the control circuit 232 estimates a rotating and direction and position, that is, an angle in a rotating direction of the rotor shaft 222a, and performs energization control on the basis of the rotating position of the rotor shaft 222a. That is, the positive-side switching elements are sequentially turned ON by a predetermined electrical angle, and the negative-side switching elements with the phase different from that of the positive-side switching elements are sequentially turned ON and OFF by a predetermined electrical angle, thereby switching energization of the armature coils 221a, 221b, and 221c of the respective phases to commutate a phase current. With repetition of the above-described control, a revolving magnetic field is formed by the stator 21 to rotate the rotor 22.

Furthermore, the brushless motor 219 in this embodiment performs switching control between ON and OFF of the switching element 230a to reverse the direction of energization of the armature coils 221a, 221b, and 221c, thereby allowing the rotor shaft 222a to rotate positively, stop, and rotate backward. The wiper arms 214 and 216 make reciprocating motions with drive power of the rotor shaft 222a within the range of a predetermined angle, and the windshield 211 is wiped by the wiper blades 217 and 218.

Furthermore, in controlling the rotation number of the rotor shaft 222, the brushless motor 219 in this embodiment can perform field weakening control. Field weakening control is control of weakening a magnetic field as much as possible, the magnetic field formed by supplying a current to the armature coils 221a, 221b, and 221c. As will be specifically described below, field weakening control is control of advancing the energization timing of the armature coils 221a, 221b, and 221c by 30 degrees (leading phase) compared with normal energization timing. That is, the control takes a leading phase. When field weakening control is performed, a back electromotive force in the armature coils 221a, 221b, and 221c is decreased, and the rotation number of the rotor shaft 222 is increased.

Furthermore, in controlling outputs, that is, the rotation number and torque, of the rotor shaft 222a, the brushless motor 219 of this embodiment can switch between first control and second control. An example of a condition for switching between the first control and the second control can be a travelling speed of the vehicle 210. The control circuit 232 has stored in advance therein a reference vehicle speed serving as a threshold value for switching between the first control and the second control. And, when an actual vehicle speed detected with a signal from the vehicle-speed sensor 240 is equal to or lower than the reference vehicle speed, the first control is performed. When the actual vehicle speed detected with the signal from the vehicle-speed sensor 240 exceeds the reference vehicle speed, the second control is performed.

Figure 17A:
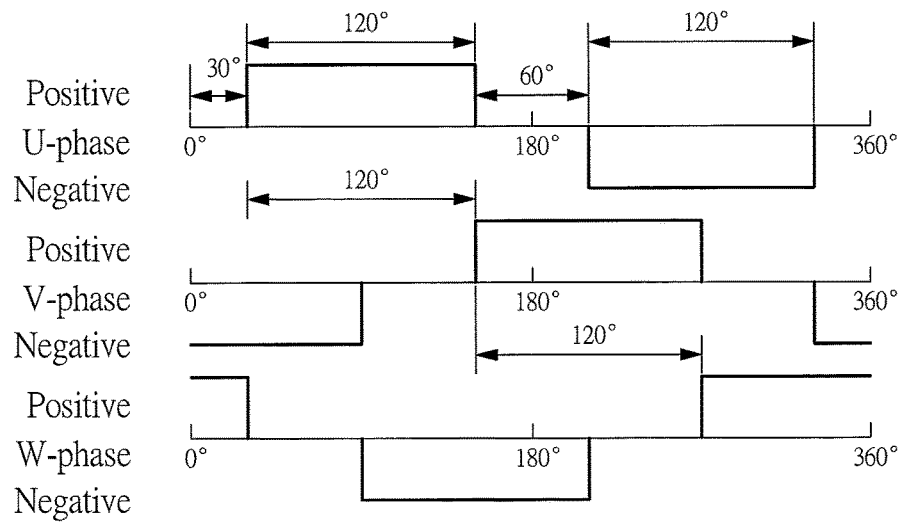
FIGS. 17A to 17C are diagrams showing examples of first and second controls which are performed by the brushless motor according to the present invention.

Examples of the first control and the second control are described with reference to FIG. 17. Angles from 0° to 360° shown in FIG. 17 are electrical angles each representing an energization period in one cycle of an electrical signal. Positive represents energization from the positive pole, and negative represents energization from the negative pole. FIG. 17A depicts an example of the first control. In the U phase, energization starts from the positive pole at 30° with 0° taken as a reference position, energization is kept in a range of an electrical angle of 120°, and then energization from the positive pole ends. Furthermore, energization from the negative pole starts at an interval of a predetermined electrical angle after energization from the positive pole ends, energization is kept in a range of an electrical angle of 120°, and then energization ends.

On the other hand, in the V phase, energization from the positive pole starts at the time when energization from the positive pole in the U phase ends. After energization is kept in a range of an electrical angle of 120°, energization ends. Furthermore, in the V phase, energization from the negative pole starts at the time when energization from the negative pole in the U phase ends. After energization from the negative pole is kept in a range of an electrical angle of 120 degrees, and then energization from the negative pole ends. Furthermore, in the W phase, energization from the positive pole starts at the time when energization from the positive pole in the V phase ends. After energization from the positive pole is kept in a range of an electrical angle of 120 degrees, energization from the positive pole ends. Furthermore, in the W phase, energization from the negative pole starts at the time when energization from the negative pole in the V phase ends. After energization from the negative pole is kept in a range of an electrical angle of 120 degrees, energization from the negative pole ends. As such, in the first control, ranges in which energization from the positive pole and energization from the negative pole are kept, that is, energization angles, are both 120°.

Figure 17B:
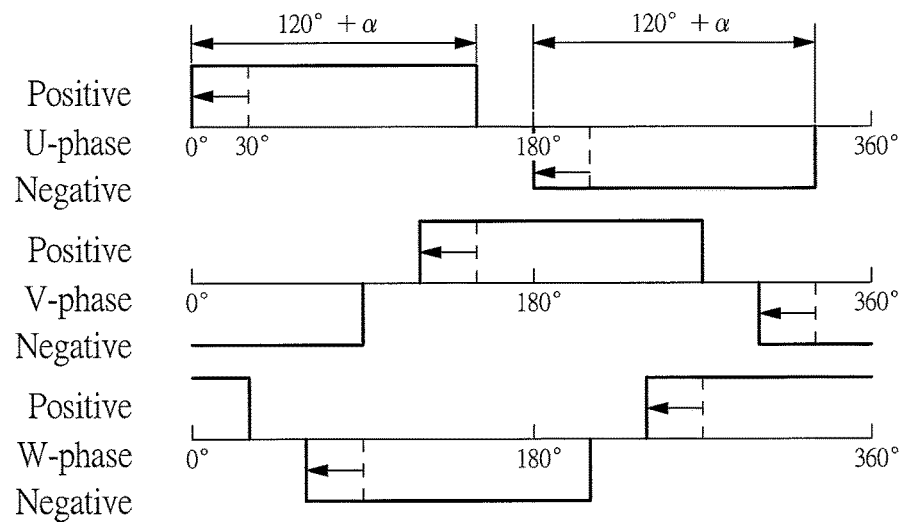

Next, description is made on the basis of FIG. 17B showing an example of the second control. In the U phase, energization from the positive pole starts at 0°. After energization from the positive pole is kept in a range of an electrical angle of 120+α degrees, energization from the positive pole ends. Furthermore, energization from the negative pole starts after energization from the positive pole ends. After energization from the negative pole is kept in a range of an electrical angle of 120+α degrees, energization from the negative pole ends.

In the V phase, energization from the positive pole starts while energization from the positive pole in the U phase is being performed. Furthermore, after energization from the positive pole is kept in a range of an electrical angle of 120+α degrees, energization from the positive pole ends. Furthermore, energization from the negative pole starts after energization from the positive pole ends and while energization from the negative pole in the U phase is being kept. After energization from the negative pole is kept in a range of an electrical angle of 120+α degrees, energization from the negative pole ends.

In the W phase, energization from the positive pole starts while energization from the negative pole in the U phase and while energization from the positive pole in the V phase are being performed. Furthermore, after energization from the positive pole is kept in a range of an electrical angle of 120+α degrees, energization from the positive pole ends. Furthermore, energization from the negative pole starts after energization from the positive pole ends, while energization from the positive pole in the U phase is being kept, and while energization from the negative pole in the V phase is being kept. After energization from the negative pole is kept in a range of an electrical angle of 120+α degrees, energization from the negative pole ends. In FIG. 17B, each of a portion where energization of the positive pole in the U phase and that in the V phase overlap, a portion where energization thereof in the V phase and that in the W phase overlap, and a portion where energization thereof in the W phase and that in the V phase overlap is a range of α. The same goes for energization of the negative pole.

Figure 17C:
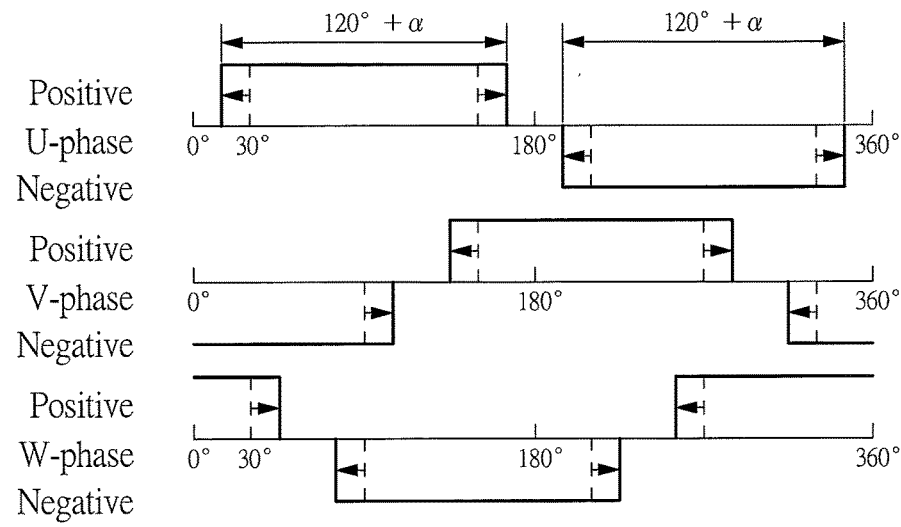

Furthermore, another example of the second control will be described hereinafter on the basis of FIG. 17C. In the U phase, energization from the positive pole starts from an electrical angle exceeding 0 degrees and smaller than 30 degrees. After energization from the positive pole is kept in a range of an electrical angle of 120+α degrees, energization from the positive pole ends. Note that energization control in the negative pole of the U phase, energization control in the positive pole and the negative pole of the V phase, and energization control in the positive pole and the negative pole of the W phase are the same as those in FIG. 17B. Furthermore, an energization angle of 120+α degrees means that the energization angle has a value exceeding 120 degrees. In this embodiment, the energization angle of the brushless motor 219 is controlled in a range equal to or larger than 120° and equal to or smaller than 180 degrees.

As such, the energization angle in the examples of the second control is wider than the energization angle in the example of the first control. That is, the first control and the second control have different energization angles. In FIG. 17C, each of a portion where energization of the positive pole in the U phase and that in the V phase overlap, a portion where energization thereof in the V phase and the W phase overlap, and a portion where energization thereof in the W phase and the V phase overlap is a range of a. The same goes for energization of the negative pole.

Figure 18:
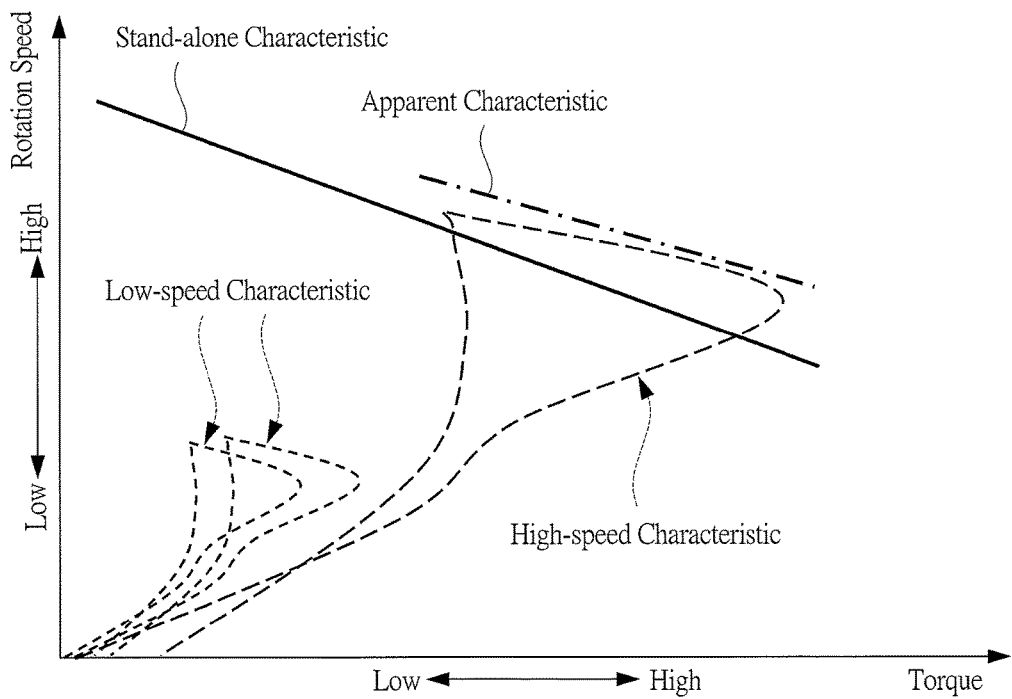
FIG. 18 is a diagram showing characteristics of the brushless motor according to the present invention.

And, together with the first control or the second control, the duty-ratio control described above is performed to control the rotation number of the rotor shaft 222a. FIG. 18 is a diagram showing characteristics of the brushless motor 219. A standalone characteristic of the brushless motor 219 is indicated by a solid line. And, by controlling the energization angle of the brushless motor 219, an apparent characteristic can be positioned as indicated by a one-dot-chain line. The standalone characteristic represents a characteristic satisfying a target output when the actual vehicle speed of the vehicle 210 is equal to or lower than the reference vehicle speed, that is, a low-speed characteristic. The apparent characteristic represents a characteristic satisfying a target output when the actual vehicle speed of the vehicle 210 exceeds the reference vehicle speed, that is, a high-speed characteristic. The target output is represented by the rotation number and torque of the rotor shaft 222a. Condition for determining the target output include the operation signal of the wiper switch 237, the traveling speed of the vehicle 210, operating positions of the wiper arms 214 and 216, etc.

In the brushless motor 219 of this embodiment, when the target output has a characteristic identical to or below the standalone characteristic, the first control is performed, and the duty ratio is controlled, thereby decreasing the rotation number of the rotor shaft 222a and obtaining a low-speed characteristic. In contrast, when the target output is a characteristic exceeding the standalone characteristic, the second control is performed to increase the rotation number of the rotor shaft 222a, and control the duty ratio, thereby obtaining the high-speed characteristic. Thus, the rating in design of the brushless motor 219 can be determined with reference to the standalone characteristic, and the brushless motor 219 can be reduced in size as much as possible. With the energization angle widened without changing the current value of the brushless motor 219, the rotation number of the rotor shaft 222a is increased to increase torque, which means that the torque constant is relatively increased. In other words, the brushless motor 219 of this embodiment can generate high torque as much as possible with less power consumption, thereby improving motor efficiency. Furthermore, when the output of the brushless motor 219 is assumed to be constant, power consumption can set low.

Furthermore, the rating of the brushless motor 219 can be decreased as much as possible, and this means that the thickness of each of the armature coils 221a, 221b, and 221c is made thin as much as possible. As a result, the number of turns of each of the armature coils 221a, 221b, and 221c wound around the stator 221 increases, and electrical resistance as the brushless motor 219 relatively increases. Thus, for example, the current flowing through the switching element 230a when the driving device 233 is out of order, that is, an allowable current, can be relatively decreased. The allowable current in the switching element 230a is relatively decreased, thereby contributing to a decrease in size of the driving device 233. Thus, this contributes to a decrease in size of the brushless motor 219, and there is a merit in improving layoutability in placing the brushless motor 219 inside an engine room of the vehicle 210.

Figure 19:
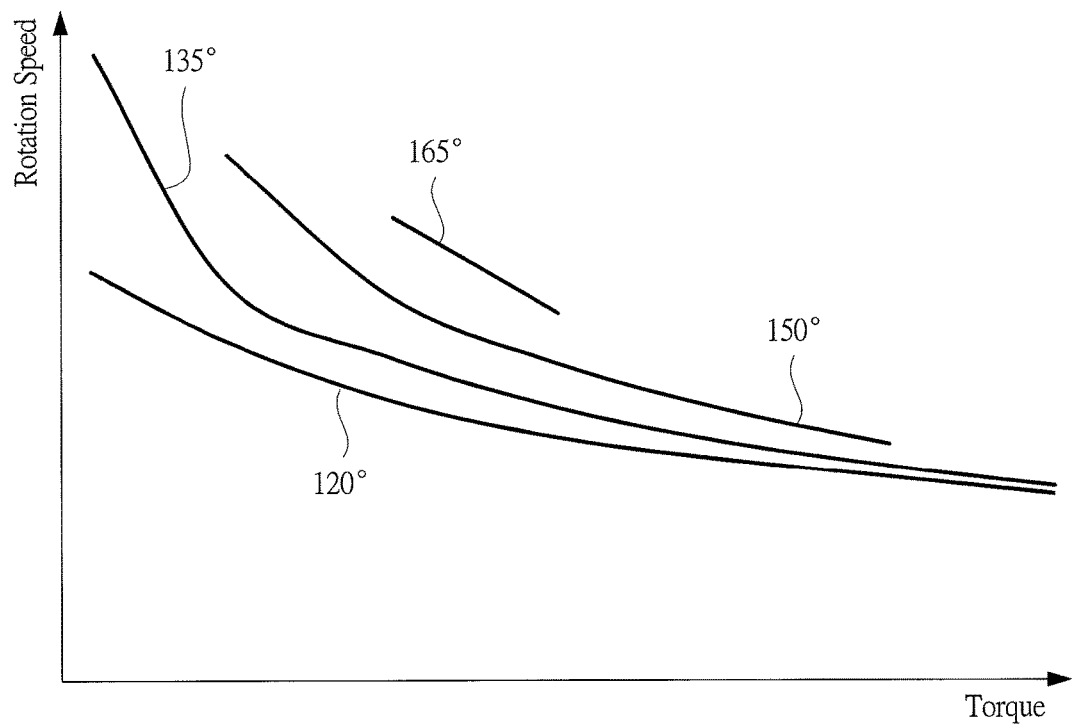
FIG. 19 is a diagram showing a relation between characteristics and electrical angle of the brushless motor according to the present invention.

Here, an example of a relation between characteristics and energization angle of the brushless motor 219 will be described on the basis of FIG. 19. The characteristics of the brushless motor 219 are represented by the rotation number and torque. In FIG. 19, the relations corresponding to angles of 120, 135, 150 and 165 degrees are shown as energization angle. As shown in FIG. 19, the brushless motor 219 has characteristics in which the rotation number increases as the energization angle increases, when torque is assumed to be the same.

Figure 20:
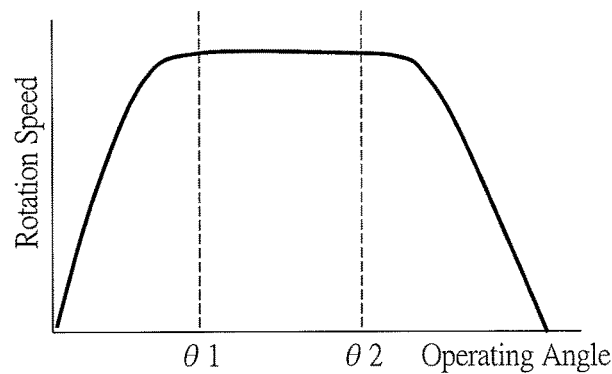
FIG. 20 is a diagram showing one example of control which is performed on the basis of an operating angle in the brushless motor according to the present invention.

Next, another example of the condition for performing the first and second controls will be sequentially described. For example, as shown in FIG. 20, the first control and the second control can be performed on the basis of the operating angle of the rotor shaft 222a obtained from the detection signal from the Hall IC 239. In FIG. 20, the vertical axis represents the rotation number of the rotor shaft 222a, and the horizontal shaft represents the operating angle. The rotation number of the rotor shaft 222a is indicated by a solid line. The operating angle includes the operating angle of the rotor shaft 222a corresponding to the operating positions of the wiper arms 214 and 216.

Figure 13:
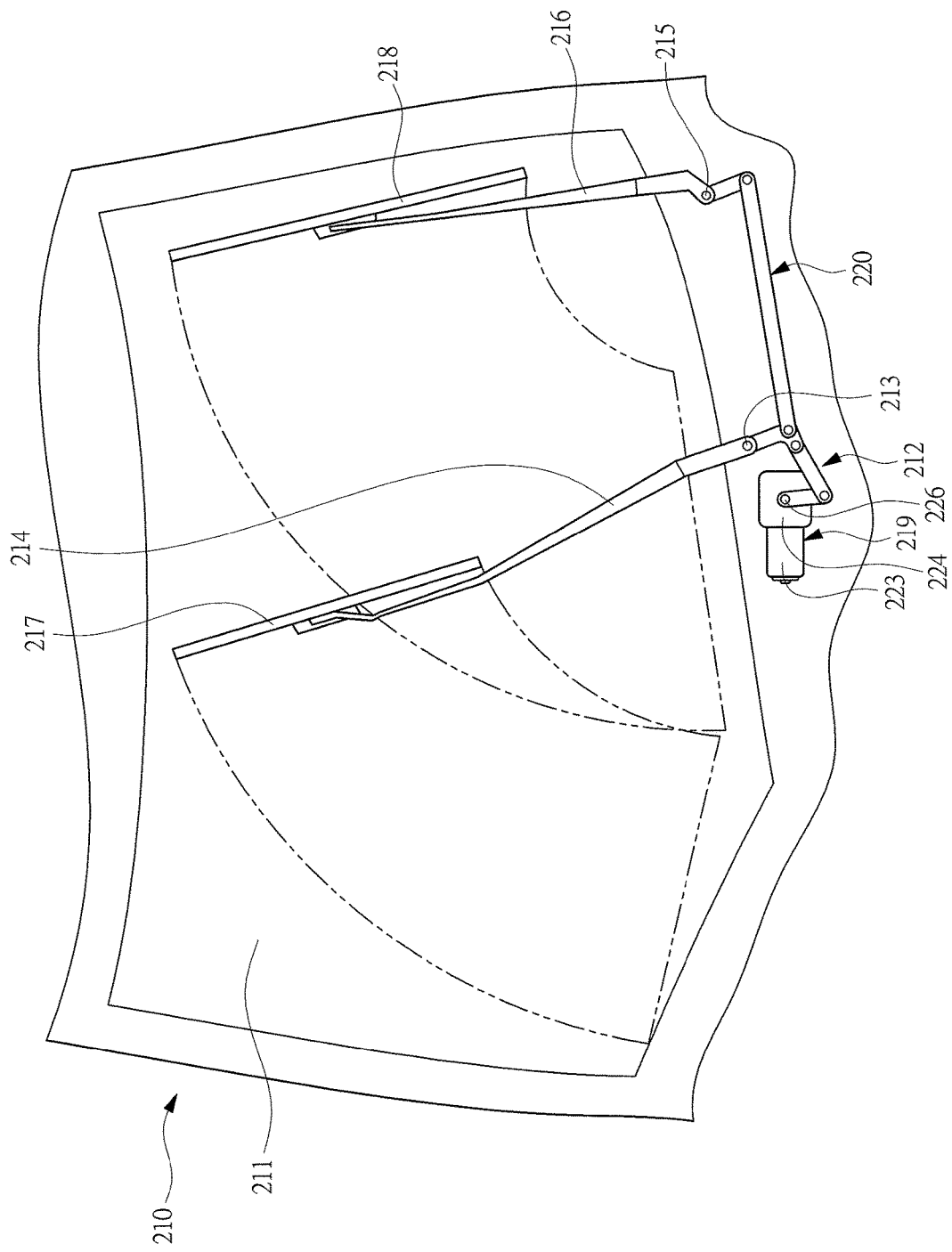
FIG. 13 is a schematic view showing still another example in which a brushless motor according to the present invention is applied to a wiper apparatus of a vehicle.

As will be specifically described below, the operating angle of the rotor shaft 222a is a rotation angle when the wiper arms 214 and 216 shown in FIG. 13 operate from initial positions closest to the brushless motor 219, that is, predetermined positions. The maximum value of the operating angle of the rotor shaft 222a corresponds to positions where the wiper arms 214 and 216 are reversed. That is, as the operating positions of the wiper arms 214 and 216 are further away from the brushless motor 219, the operating angle of the rotor shaft 222a is increased. Here, when the wiper arms 214 and 216 starts motions from the initial positions, the rotation number increases as the operating angle of the rotor shaft 222a increases. Between an operating angle θ1 and an operating angle θ2, the rotation number of the rotor shaft 222a is approximately constant. Then, between the operating angle θ2 and the maximum value, the rotation number of the rotor shaft 222a gradually decreases.

In contrast to the above, when the wipers 214 and 216 are reversed, the rotation number of the rotor shaft 22a increases between the maximum value and the operating angle θ. Furthermore, between the operating angle θ2 and the operating angle θ1, the rotation number of the rotor shaft 222a is approximately constant. Then, between the operating angle θ1 and the initial position, the rotation number of the rotor shaft 222a gradually decreases. Then, the first control can be performed with the operating angle θ1, and the second control can be performed with the operating angle θ2. Here, the operating angle θ2 is larger than the operating angle θ1. Note that in performing the first control and the second control on the basis of the operating angle of the wiper arms 214 and 216, the operating angle of the wiper arms 214 and 216 can be found on the basis of the detection signal from the output shaft sensor 236.

Figure 21:
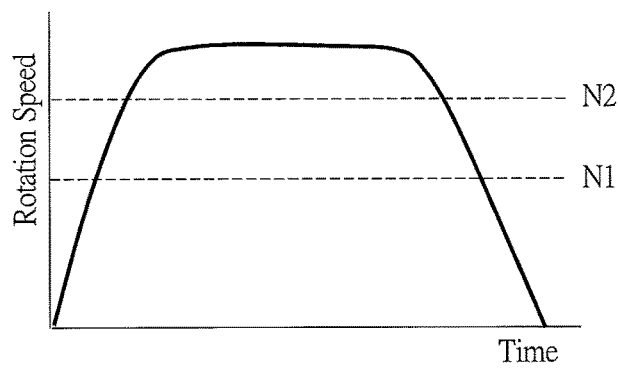
FIG. 21 is a diagram showing one example of control which is performed on the basis of the rotation number in the brushless motor according to the present invention.

Furthermore, another example of the condition for performing the first control and the second control will be described on the basis of FIG. 21. Here, the first control and the second control can be performed on the basis of the rotation number of the rotor shaft 222a obtained from the detection signal from the Hall IC 239. In FIG. 21, the vertical axis represents the rotation number, and the horizontal axis represents time. The rotation number is indicated by a solid line. The time shown in FIG. 21 means an elapsed time from the time when the wiper arms 214 and 216 operate from the initial positions to the time when they reach reverse positions. And, the first control is performed when the actual rotation number of the rotor shaft 222a is equal to a rotation speed N1, and the second control is performed when the actual rotation number of the rotor shaft 222a is equal to a rotation speed N2. Here, the rotation speed N2 is larger than the rotation speed N1.

As the rotation number shown in FIG. 21, the rotation number of the output shaft 226 can be used. That is, with the rotation number of the output shaft 226 obtained from the signal from the output shaft sensor 236, the first control and the second control can be performed. With this control, switching is made between the first control and the second control on the basis of the operation speed of the wiper arms 214 and 216.

Note that when the rotor shaft 222a starts to rotate from a position corresponding to the initial positions of the wiper arms 214 and 216, the rotation number of the rotor shaft 222a increases with the lapse of time. Then, the rotation number of the rotor shaft 222a is kept constant for a predetermined period of time, and the rotation number of the rotor shaft 222a is gradually decreased. When the wiper arms 214 and 216 return from their reverse positions, the characteristic in change of the rotation number is opposite to the above.

Figure 22:
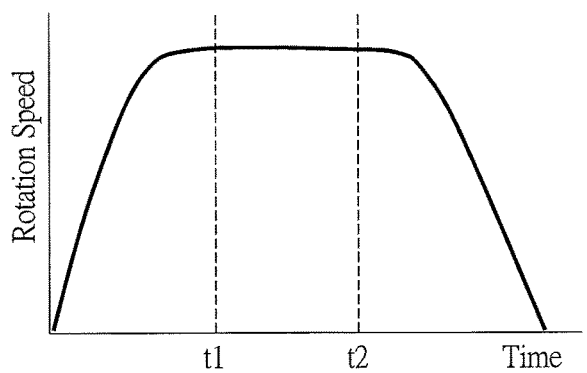
FIG. 22 is a diagram showing one example of control which is performed on the basis of time in the brushless motor according to the present invention.

Furthermore, another example of the condition for performing the first control and the second control will be described on the basis of FIG. 22. Here, the first control and the second control are performed on the basis of the rotation number of the rotor shaft 222a detected by the Hall IC 239. In FIG. 22, the vertical axis represents the rotation number of the rotor shaft 222a, and the horizontal axis represents time. The time shown in FIG. 22 means the same as the time shown in FIG. 21. And, the first control is performed at a time t1 when a predetermined time elapses from the time when the wiper arms 214 and 216 start operation from the initial positions. Furthermore, the second control is performed at a time t2 when a predetermined time further elapses from the time t1. Note that the rotation number of the output shaft 226 detected by the output shaft sensor 236 can be used as the rotation number in FIG. 22. That is, switching can be made between the first control and the second control on the basis of the operation speed of the wiper arms 214 and 216.

Furthermore, another example of the condition for performing the first control and the second control will be described on the basis of FIG. 23. FIG. 23A shows second control corresponding to high-speed wiping, and FIG. 23B shows first control corresponding to low-speed wiping. Here, FIGS. 23A and 23B shows controls of changing the advance angle and the energization angle when the operating angle θ is changed for both vehicle speeds. Furthermore, the amount of change of the advance angle and the energization angle with respect to the amount of change of the operating angle θ may be the same for all vehicle speeds, or may be changed for each vehicle speed.

Figure 24A:
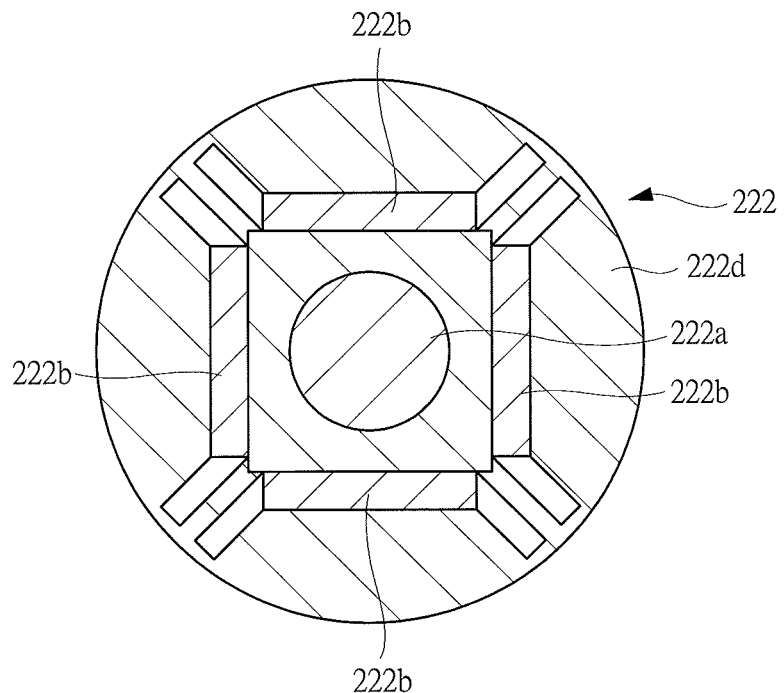
FIGS. 24A and 24B are sectional views showing examples of the structure of a rotor for the brushless motor according to the present invention.
Figure 24B:
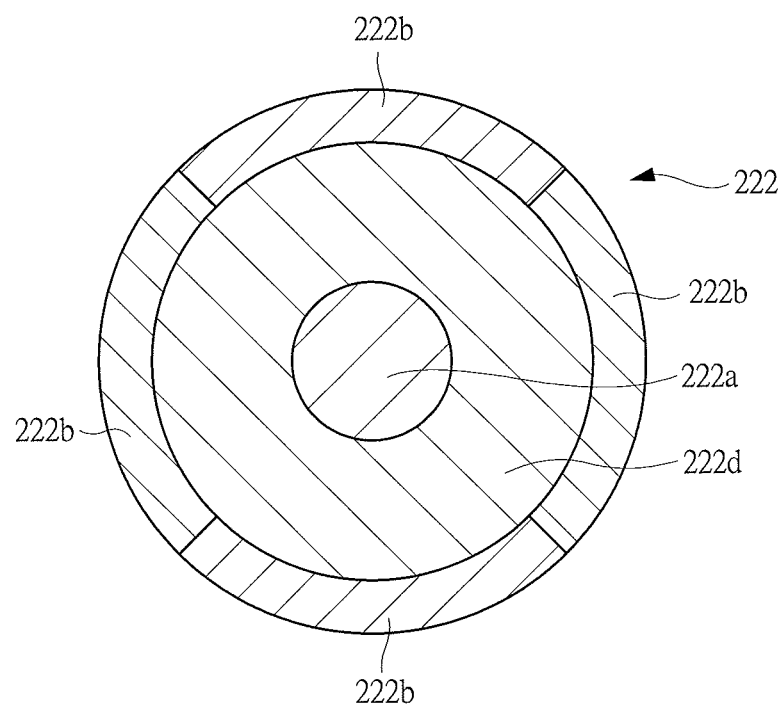

Next, an example of the structure of the rotor 222 for use in the brushless motor 219 will be described on the basis of FIG. 24. The structure of the rotor 222 of the brushless motor 219 includes an IPM (Interior Permanent Magnet) structure and a SPM (Surface Permanent Magnet) structure. The IPM structure is a structure of the rotor 222 with the permanent magnets 222b buried inside the rotor core 222d, as in FIG. 24A. The SPM structure is a structure of the rotor 222 with the permanent magnets 222b fixed to the surface of the rotor core 222d, as in FIG. 24B. That is, in the rotor 222 of the IPM structure, the rotor core 222d formed of an iron-based magnetic material is placed on the surface of the rotor 222. In contrast, in the rotor 222 of the SPM structure, the permanent magnets 222b are placed on the surface of the rotor 222. And, while the magnetic permeability of the iron-based magnetic material is large on the order of $10^3$ with respect to air, the magnetic permeability of the permanent magnets are close to that of air in value. Therefore, the rotor 222 of the SPM structure has an inductance smaller than that of the rotor 222 of the IPM structure.

In the control of the brushless motor 219 of this embodiment, since the energization angle is enlarged more than general 120 degrees, a non-energization section of each phase is narrowed. Thus, to quicken current switching, it is desired to decrease a current delay section at the time of OFF of the switching element due to inductance. Thus, as the structure of the rotor 222, the SPM structure is preferred to the IPM structure.

Furthermore, even when the rotor 222 is of the SMP structure, if ferrite magnets are used as the permanent magnets 222b, the axial length of a magnetic circuit to be formed is increased. In general, the inductance in an armature coil is proportional to the axial length of a magnetic circuit. Therefore, when ferrite magnets are used as the permanent magnets 222b, inductance in the armature coils 221a, 221b, and 221c is large. In contrast, if the rotor 222 is of the SPM structure using rare-earth sintered magnets as the permanent magnets 222b, the axial length of the magnetic circuit to be formed is decreased, and inductance in the armature coils can be reduced. However, since the rare-earth sintered magnets include expensive heavy rare earth elements (Dy, Tb), the brushless motor 219 becomes expensive.

Thus, as the permanent magnets 222b, it is preferable to use ring magnets of rare-earth-bonded magnets capable of a short axial length of the magnetic circuit to be formed and not including a heavy rare earth element. Here, the rare-earth-bonded magnets include a neodymium-bonded one and a SmFeN-bonded one. Furthermore, the neodymium-bonded one and the SmFeN-bonded one both include isotropic and anisotropic ones.

Next, the number of permanent magnets to be mounted on the rotor, that is, the number of poles, and the number of slots of the stator having armature coils wound therearound are described. When a ratio between the number of poles and the number of slots is represented as the number of poles: the number of slots, relations are broadly classified into 2n:3n, 4n:3n, 8n:9n, 10n:9n, 10n:12n, and 14n:12n. Here, n is an integer equal to or larger than 1. In the structures of 8n:9n, 10n:9n, 10n:12n, and 14n:12n, positional relations between the armature coils of the same phase and the permanent magnets vary. Therefore, by providing an advance angle to the energization timing or enlarging the energization angle, the phase of energization advances with respect to a base value. Thus, the permanent magnets tend to be demagnetized.

Figure 25:
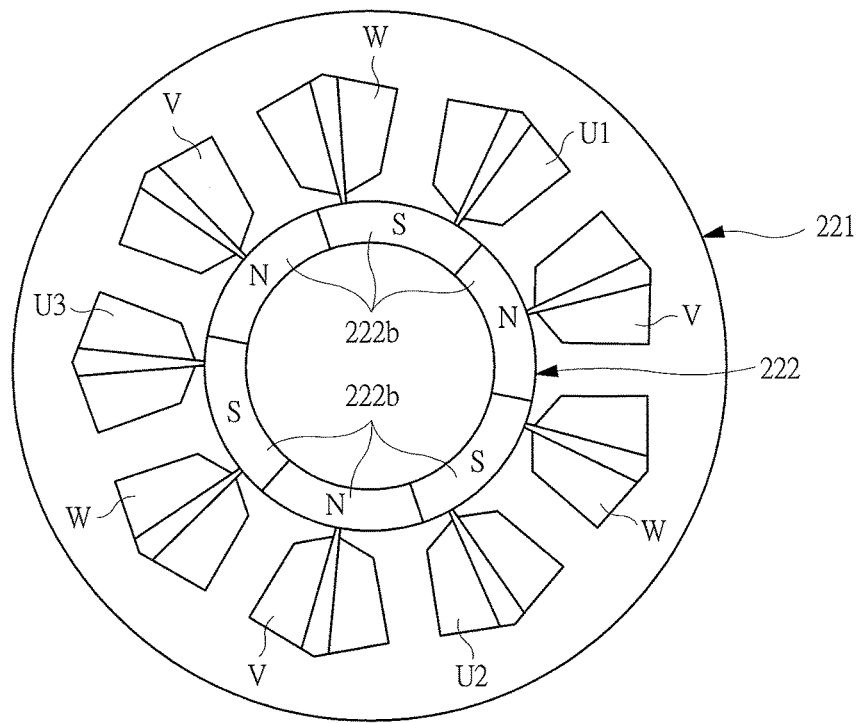
FIG. 25 is a schematic view showing one example of the relation between rotor and stator in the brushless motor according to the present invention.
Figure 26:
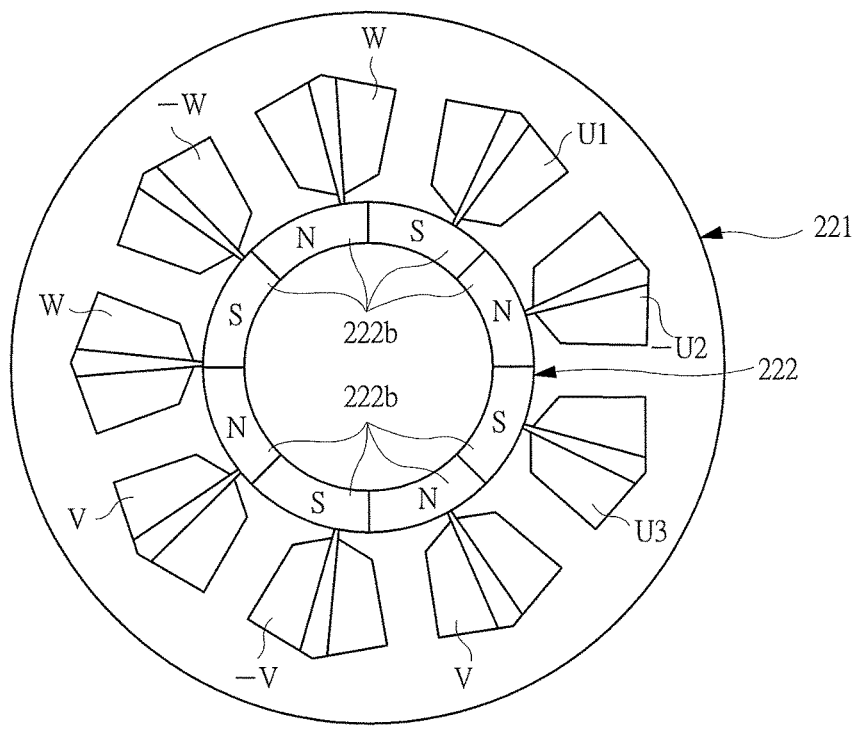
FIG. 26 is a schematic view showing another example of the relation between rotor and stator in the brushless motor according to the present invention.

FIG. 25 is a schematic view showing an example of the rotor and the stator corresponding to six poles and nine slots, and FIG. 26 is a schematic view showing an example of the rotor and the stator corresponding to eight poles and nine slots. That is, FIG. 25 depicts an example when 2n:3n described above and n is 3. In FIG. 25 and FIG. 26, V represents a V phase, U represents a U phase, and W represents a W phase. Furthermore, a sign of "−" in each phase indicates that the armature coil is wound in reverse. Furthermore, FIG. 26 depicts an example when 8n:9n and n is 1. In FIG. 25, positional relations between armature coils U1, U2, and U3 of the same phase and the permanent magnets 222b are identical in a circumferential direction. Thus, when an advance angle setting value of the energization timing is set as an electrical angle θ1, the advance angle of each armature coil is represented by $$U1{:}\theta1 = U2{:}\theta1 = U3{:}\theta1.$$

In contrast, in FIG. 26, positional relations between the armature coils U1, U2, and U3 of the same phase and the permanent magnets 222b vary in the circumferential direction. Thus, when an advance angle setting value of the energization timing is set as an electrical angle θ1, the advance angle of each armature coil is represented by $$U1{:}\theta1{-}20° = U2{:}\theta1 = U3{:}\theta1{+}20°.$$

Note that the rotating direction of the rotor 222 is assumed to be a clockwise direction when viewed from an axial end on a worm wheel 225 side, that is, CW. As such, the permanent magnets 222b facing U3 have a large advance angle, and therefore tends to be demagnetized.

Thus, to perform the first control and the second control, a brushless motor having a structure of 2n:3n or 4n:3n, where positional relations between the armature coils of the same phase and the permanent magnets are identical, is desirable. Furthermore, when the number of permanent magnets increases, a mechanical influence of the electrical angle with respect to the rotation angle increases. That is, the influence of delay of the current increases. Thus, with the same number of slots, a structure of 2n:3n is desirable, where the number of permanent magnets can be reduced. Note that the driving device 233 and the stator 221 may have an integral structure or separate structure. However, the driving device 233 and the stator 221 desirably have an integral structure so as to allow short wiring from the driving device 233 to the armature coils and small wiring resistance.

Figure 27:
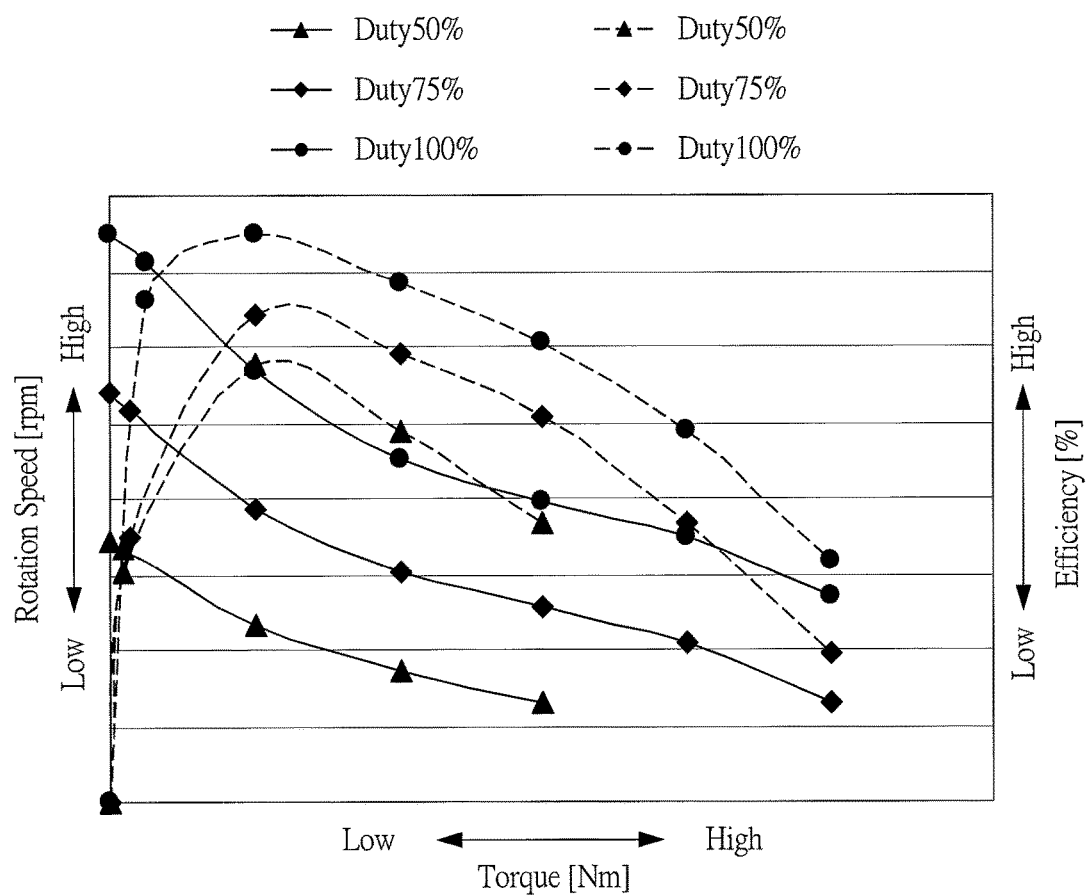
FIG. 27 is a diagram showing characteristics of the brushless motor according to the present invention.

Furthermore, when the duty ratio of the brushless motor 219 is controlled, motor efficiency, which is an example of motor characteristics, including the driving device 233, increases as the duty ratio increases. This is because loss due to the driving device 233 increases as the duty ratio is lower. An example of relation between duty ratios and motor characteristics is shown in FIG. 27. In FIG. 27, the vertical axis represents the rotation number of the rotor shaft and motor efficiency, and the horizontal axis represents torque of the rotor shaft. Furthermore, in FIG. 27, Duty represents duty ratios. Note in FIG. 27 that solid lines each represent a relation between torque and the rotation number and broken lines each represent a relation between torque and efficiency.

In the brushless motor 219 of this embodiment, as a condition for switching between the first control and the second control, the operation of the wiper switch 237 can be used. When the amount of rainfall or the amount of snowfall is small, the driver can operate the wiper switch 237 to select a low-speed wiping mode for causing the wiper arms 214 and 216 to operate at a predetermined low speed.

In contrast, when the amount of rainfall or the amount of snowfall is large, the driver can operate the wiper switch 237 to select a high-speed wiping mode for causing the wiper arms 214 and 216 to operate at a speed higher than the low speed. The driver determines whether the amount of rainfall or the amount of snow fall is large or small on the basis of his or her personal point of view, and there is no objective criterion for distinguishing between a large amount and a small amount of rainfall or snowfall. As a premise for allowing switching between the high-speed wiping mode and the low-speed wiping mode with the wiper switch 237, the first control can be performed when the low-speed wiping mode is selected and the second control can be performed when the high-speed wiping mode is selected.

Furthermore, since the brushless motor 219 of this embodiment is not provided with a brush, a commutator (commutator), etc., friction torque due to sliding between a brush and a commutator does not occur, thereby preventing a decrease in efficiency of the motor and an increase in temperature of the brush and avoiding restriction of motor output. Furthermore, in the brushless motor 219 of this embodiment, the occurrence of noise and the occurrence of operation sound due to the presence of the brush can be prevented, and silence can be ensured. Note that while the description in the above-described embodiment is such that switching is made between the first control and the second control on the basis of the rotation number, torque, or operating angle of the rotor shaft 222a, the rotor shaft 222a is an element configuring part of the rotor 222, and therefore the same technical meaning can be achieved if the rotor shaft 222a described in the above-described embodiment is replaced by the rotor 222.

It goes without saying that the present invention is not limited to the above-described embodiment and can be variously modified within a range not deviating from the gist of the invention. For example, the wiper apparatus includes the structure in which the rotor shaft of the brushless motor is rotated only in one direction to cause the wiper arms to swing on a pivot shaft. Furthermore, the wiper switch is not limited to the one operated by operation of the driver, and may be a detection switch having a function of detecting the amount of rainfall, the amount of snowfall, etc. With the structured described above, the rotation speed control unit automatically starts the wiper apparatus on the basis of the amount of rainfall, the amount of snowfall, etc., and performs control of automatically switching between the low-speed wiping mode and the high-speed mode. In this case, the rotation speed control unit has stored in advance therein data such as the amount of rainfall, the amount of snowfall, etc., which serve as a reference for switching between the low-speed mode and the high-speed mode.

Furthermore, the vehicle-speed sensor which detects a travelling speed of the vehicle may not directly detect the traveling speed of the vehicle but may detect it from information transmitted from the wiper blade to the wiper apparatus or information indirectly transmitted to the brushless motor, such as resistance and the state of a wipe surface. Here, the resistance include resistance received by the wiper blade due to travelling wind and resistance when the wipe surface is wiped, and the wiper apparatus detects the resistance, the state of the wipe surface, etc., from the wiper blade via the output shaft. Furthermore, the information indirectly transmitted to the brushless motor is to recognize information obtained from the resistance, the state of the wipe surface, etc., as a traveling speed of the vehicle, and is detected by being converted so as to be detected by the driving device as a traveling speed of the vehicle. Furthermore, the number of armature coils and the number of permanent magnets can be changed at will.

Furthermore, the wiper apparatus of the present invention includes one in which a wiper blade wipes the rear windshield. That is, the windshield in the wiper apparatus of the present invention includes a windshield and a rear windshield. Furthermore, the wiper apparatus of the present invention includes the structure in which the output shaft provided coaxially with the worm wheel serves as a pivot shaft. Furthermore, the wiper apparatus of the present invention includes the structure in which two wiper arms are individually driven by separate brushless motors.

Furthermore, the brushless motor of the present invention includes an inner rotor type brushless motor having the rotor located inside the stator or an outer rotor type brushless motor having the rotor placed outside the stator. Furthermore, in addition to a wiper motor which operates a wiper apparatus, the brushless motor of the present invention includes, in a convenient-and-comfortable-type device provided in a vehicle, for example, a power sliding door device, a sun roof device, or a power window device, a brushless motor provided to operate an operating member such as a door, roof, or windshield.

The brushless motor is used as a driving source of a wiper apparatus or the like mounted on a vehicle such as an automobile. With the brushless motor driven to rotate, the wiper blade performs reciprocating wiping operation on the windshield surface, thereby favorably keeping the field of view of the driver or the like.

While the present invention has been illustrated and described with respect to a particular embodiment thereof, it should be appreciated by those of ordinary skill in the art that various modifications to this invention ma be made without departing from the spirit and scope of the present.

What is claimed is:

1. A brushless wiper motor comprising:
   a cylindrical case;
   a frame having an opening which is connected to the case; and
   a cover which covers the opening of the frame,
   wherein a stator and a rotor are housed in the case, the stator having a plurality of armature coils, the rotor being located inside the stator and rotatably supported by the case, the rotor having: a rotating shaft formed with a worm; and permanent magnets having alternately-arranged poles,
   a worm wheel is housed in the frame, the worm wheel having: a gear meshed with the worm of the rotating shaft and adapted to reduce a rotation of the rotor; an output shaft adapted to output the reduced rotation; and an output shaft sensor adapted to detect a signal of either or both the reduced rotation and an absolute position of the output shaft,
   a control board is fixed to the cover, a plurality of switching elements being arranged on the control board and adapted to drive and control the rotation of the rotor,
   a driving device is provided on the control board, the driving device having: an inverter circuit adapted to control energization of the armature coils; a control circuit adapted to receive the signal of either or both the reduced rotation and the absolute position of the output shaft detected by the output shaft sensor, and to perform ON/OFF switching control of the switching elements; a PWM signal generating circuit adapted to generate a signal which is inputted to the control circuit, and an induced voltage detecting unit electrically connected to the armature coils and adapted to detect induced voltages which are generated in the armature coils by the rotation of the rotor,
   a pattern for a first control of the switching elements is stored in the control circuit, and to control the rotation of the rotor in a first control mode, the pattern for the first control causes the switching elements to supply current to the armature coils at predetermined energization timing on the basis of a signal detected by the induced voltage detecting unit,
   a pattern for a second control of the switching elements is stored in the control circuit, and to control the rotation of the rotor in a second control mode, the pattern for the second control causes the switching elements to supply current to the armature coils at energization timing advanced from the energization timing for the first control mode, to form a weakened revolving magnetic field which is smaller than a revolving magnetic field for the first control mode, to decrease a back electromotive force of the armature coils, and to increase the rotation number of the rotor, the ON/OFF switching control of the switching elements is performed so as to rotate the rotor forward and backward.

2. The brushless wiper motor according to claim 1, wherein
the energization timing of the switching elements in the second control mode is advanced from the energization timing of the switching elements in the first control mode by an electric angle of 30 degrees.

3. The brushless wiper motor according to claim 1, wherein a Hall element is mounted on the control board and arranged so as to face a sensor magnet fixed to the rotating shaft of the rotor and adapted to detect the rotation of the rotor.

4. The brushless wiper motor according to claim 1, wherein a vehicle speed sensor is mounted on the control board.

5. The brushless wiper motor according to claim 1, wherein the switching elements are composed of a plurality of field effect transistors.

6. A brushless wiper motor comprising:
a cylindrical case;
a frame having an opening which is connected to the case; and
a cover which covers the opening of the frame,
wherein a stator and a rotor are housed in the case, the stator having a plurality of armature coils, the rotor being located inside the stator and rotatably supported by the case, the rotor having: a rotating shaft formed with a worm; and permanent magnets having alternately-arranged poles,
a worm wheel is housed in the frame, the worm wheel having: a gear meshed with the worm of the rotating shaft and adapted to reduce a rotation of the rotor; an output shaft adapted to output the reduced rotation; and an output shaft sensor adapted to detect a signal of either or both the reduced rotation and an absolute position of the output shaft,
a control board is fixed to the cover, a plurality of switching elements being arranged on the control board and adapted to drive and control the rotation of the rotor,
a driving device is provided on the control board, the driving device having: an inverter circuit adapted to control energization of the armature coils; a control circuit adapted to receive the signal of either or both the reduced rotation and the absolute position of the output shaft detected by the output shaft sensor, and to perform ON/OFF switching control of the switching elements; a PWM signal generating circuit adapted to generate a signal which is inputted to the control circuit, and an induced voltage detecting unit electrically connected to the armature coils and adapted to detect induced voltages which are generated in the armature coils by the rotation of the rotor,
data for a first control of the switching elements is stored in the control circuit, and to control the rotation of the rotor in a first control mode, the data for the first control causes the switching elements to supply current to the armature coils at predetermined energization timing on the basis of a signal detected by the induced voltage detecting unit,
data for a second control of the switching elements is stored in the control circuit, and to control the rotation of the rotor in a second control mode, the data for the second control causes the switching elements to supply current to the armature coils at energization timing advanced from the energization timing for the first control mode, to form a weakened revolving magnetic field which is smaller than a revolving magnetic field for the first control mode, to decrease a back electromotive force of the armature coils, and to increase the rotation number of the rotor,
the ON/OFF switching control of the switching elements is performed so as to rotate the rotor forward and backward.

7. The brushless wiper motor according to claim 6, wherein
the energization timing of the switching elements in the second control mode is advanced from the energization timing of the switching elements in the first control mode by an electric angle of 30 degrees.

8. The brushless wiper motor according to claim 6, wherein a Hall element is mounted on the control board and arranged so as to face a sensor magnet fixed to the rotating shaft of the rotor and adapted to detect the rotation of the rotor.

9. The brushless wiper motor according to claim 6, wherein a vehicle speed sensor is mounted on the control board.

10. The brushless wiper motor according to claim 6, wherein the switching elements are composed of a plurality of field effect transistors.

11. A brushless wiper motor comprising:
a cylindrical case;
a frame having an opening which is connected to the case; and
a cover which covers the opening of the frame,
wherein a stator and a rotor are housed in the case, the stator having a plurality of armature coils, the rotor being located inside the stator and rotatably supported by the case, the rotor having: a rotating shaft formed with a worm; and permanent magnets having alternately-arranged poles,
a worm wheel is housed in the frame, the worm wheel having: a gear meshed with the worm of the rotating shaft and adapted to reduce a rotation of the rotor; an output shaft adapted to output the reduced rotation; and an output shaft sensor adapted to detect a signal of either or both the reduced rotation and an absolute position of the output shaft,
a control board is fixed to the cover, a plurality of switching elements being arranged on the control board and adapted to drive and control the rotation of the rotor,
a driving device is provided on the control board, the driving device having: an inverter circuit adapted to control energization of the armature coils; a control circuit adapted to receive the signal of either or both the reduced rotation and the absolute position of the output shaft detected by the output shaft sensor, and to perform ON/OFF switching control of the switching elements; a PWM signal generating circuit adapted to generate a signal which is inputted to the control circuit, and an induced voltage detecting unit electrically connected to the armature coils and adapted to detect induced voltages which are generated in the armature coils by the rotation of the rotor, an arithmetic expression for a first control of the switching elements is stored in the control circuit, and to control the rotation of the rotor in a first control mode, the arithmetic expression for the first control causes the switching elements to supply current to the armature coils at predetermined energization timing on the basis of a signal detected by the induced voltage detecting unit, an arithmetic expression for a second control of the switching elements is stored in the control circuit, and to control the rotation of the rotor in a second control mode, the arithmetic expression for the second control causes the switching elements to supply current to the armature coils at energization timing advanced from the energization timing for the first control mode, to form a weakened revolving magnetic field which is smaller than a revolving magnetic field for the first control mode, to decrease a back electromotive force of the armature coils, and to increase the rotation number of the rotor, the ON/OFF switching control of the switching elements is performed so as to rotate the rotor forward and backward.

12. The brushless wiper motor according to claim 11, wherein the energization timing of the switching elements in the second control mode is advanced from the energization timing of the switching elements in the first control mode by an electric angle of 30 degrees.

13. The brushless wiper motor according to claim 11, wherein a Hall element is mounted on the control board and arranged so as to face a sensor magnet fixed to the rotating shaft of the rotor and adapted to detect the rotation of the rotor.

14. The brushless wiper motor according to claim 11, wherein a vehicle speed sensor is mounted on the control board.

15. The brushless wiper motor according to claim 11, wherein the switching elements are composed of a plurality of field effect transistors.

* * * * *